US010643251B1

(12) United States Patent
Hanson et al.

(10) Patent No.: US 10,643,251 B1
(45) Date of Patent: May 5, 2020

(54) PLATFORM FOR LOCATING AND ENGAGING CONTENT GENERATORS

(71) Applicant: Zyper Inc., New York, NY (US)

(72) Inventors: Richard J. Hanson, London (GB); Andrea Orrù, London (GB)

(73) Assignee: Zyper Inc., New York, NY (US)

( * ) Notice: Subject to any disclaimer, the term of this patent is extended or adjusted under 35 U.S.C. 154(b) by 0 days.

(21) Appl. No.: 16/382,091

(22) Filed: Apr. 11, 2019

Related U.S. Application Data

(60) Provisional application No. 62/823,331, filed on Mar. 25, 2019, provisional application No. 62/777,609, filed on Dec. 10, 2018.

(51) Int. Cl.
*G06Q 30/02* (2012.01)
*G06Q 50/00* (2012.01)
*G06F 16/9535* (2019.01)

(52) U.S. Cl.
CPC ..... *G06Q 30/0276* (2013.01); *G06F 16/9535* (2019.01); *G06Q 30/0269* (2013.01); *G06Q 50/01* (2013.01)

(58) Field of Classification Search
CPC ................................................ G06Q 30/0269
See application file for complete search history.

(56) References Cited

U.S. PATENT DOCUMENTS 8,768,751 B2 7/2014 Jakowski
9,059,950 B2 6/2015 Greenzeiger
9,632,972 B1 4/2017 Moxley
9,641,619 B2 5/2017 Brophy
9,886,716 B2 2/2018 Salvatore
2009/0037257 A1 2/2009 Stuckey
2012/0209674 A1 8/2012 Neystadt
2013/0085838 A1 4/2013 Tennenholtz
2014/0081753 A1 3/2014 Mesaros
2015/0302478 A1 10/2015 Michael
2016/0019579 A1 1/2016 Sims
2017/0154359 A1 6/2017 Zukerman
2017/0249656 A1 8/2017 Gantner
2018/0047114 A1 2/2018 Haaland
2018/0150870 A1 5/2018 Haaland
2018/0158089 A1 6/2018 Tort
2019/0050911 A1* 2/2019 Fuller ................ G06Q 30/0273

OTHER PUBLICATIONS

"How Brands Can Work With Creator-Influencers: Five Keys to Effective Influencer Marketing", by Debra Aho Williamson. Published on Mar. 3, 2016. (Year: 2016).*
"What is Allowed and 'Legal' In Influencer Marketing", by Daniela La Marca. MediaBuzz. Mar. 2017—Social Media and Influencer Marketing. (Year: 2017).*

(Continued)

*Primary Examiner* — William A Brandenburg
(74) *Attorney, Agent, or Firm* — Van Pelt, Yi & James LLP

(57) ABSTRACT

Techniques for locating and communicating with users of a platform are disclosed. A specification of a target user is received. A remote platform is queried for the target user and a result of the query includes a first user of the remote platform. A message is sent to the first user, on behalf of a second user, by an entity that is different from the second user.

21 Claims, 25 Drawing Sheets

(56) References Cited

OTHER PUBLICATIONS

Feifei Kou, Junping Du, Yijiang He, and Lingfei Ye. "Social network search based on semantic analysis and learning." CAAI transactions on intelligence technology 1, No. 4 (2016): 293-302.
Longbo Kong, Zhi Liu, and Yan Huang. "Spot: Locating social media users based on social network context." Proceedings of the VLDB Endowment 7, No. 13 (2014): 1681-1684.
Michael K. Reiter and Aviel D. Rubin. "Crowds: Anonymity for web transactions." ACM transactions on information and system security (TISSEC) 1, No. 1 (1998): 66-92.
Alan Vantoai, How to Motivate and Reward Micro-Influencers, Jan. 25, 2017, www.crewfire.com/blog/how-to-motivate-and-reward-micro-influencers.
Barrett Wissman, Micro-Influencers: The Marketing Force of the Future?, Mar. 2, 2018, https://www.forbes.com/sites/barrett/wissman/2018/03/02/micro-influencers-the-marketing-force-of-the-future/#3ddcfa876707.
Bill Arnold, Influencer Marketing Part 1—Who are Influencers?, Mar. 8, 2018, https://www.prevail.marketing/blog/influencer-marketing-part-1.
Cori Uddenberg, Marketing with Micro-Influencers: 3 Ways to Drive Engagement, Jul. 19, 2017, http://screenpilot.com/2017/07/marketing-micro-influencers-3-ways-drive-engagement/.
Mavin, Why Nano Influencers are the Future of Influence Marketing, Nov. 12, 2017, https://medium.com/@mavin.network/why-nano-influencers-are-the-future-of-influence-marketing-369cada5cb9f.
Salcu et al., Gamification Applied in Affiliate Marketing. Case Study of 2Parale, Management & Marketing Challenges for the Knowledge Society, 2013, pp. 767-790, vol. 8, No. 4.

* cited by examiner

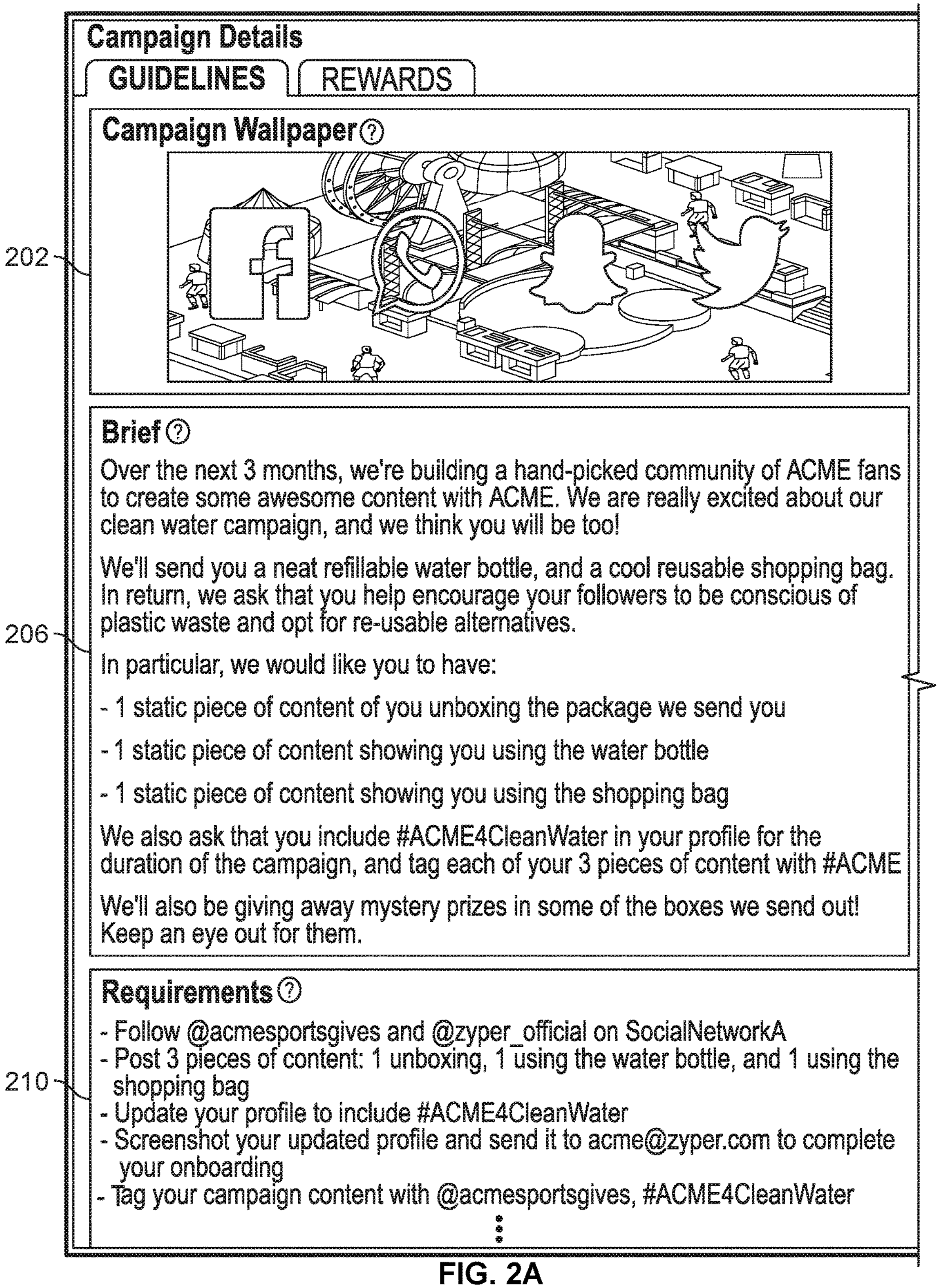

FIG. 2A

Campaign Details

[ GUIDELINES ] [ REWARDS ]

Campaign Wallpaper ⓘ

202

206

Brief ⓘ

Over the next 3 months, we're building a hand-picked community of ACME fans to create some awesome content with ACME. We are really excited about our clean water campaign, and we think you will be too!

We'll send you a neat refillable water bottle, and a cool reusable shopping bag. In return, we ask that you help encourage your followers to be conscious of plastic waste and opt for re-usable alternatives.

In particular, we would like you to have:

- 1 static piece of content of you unboxing the package we send you

- 1 static piece of content showing you using the water bottle

- 1 static piece of content showing you using the shopping bag

We also ask that you include #ACME4CleanWater in your profile for the duration of the campaign, and tag each of your 3 pieces of content with #ACME We'll also be giving away mystery prizes in some of the boxes we send out! Keep an eye out for them.

210

Requirements ⓘ

- Follow @acmesportsgives and @zyper_official on SocialNetworkA
- Post 3 pieces of content: 1 unboxing, 1 using the water bottle, and 1 using the shopping bag
- Update your profile to include #ACME4CleanWater
- Screenshot your updated profile and send it to acme@zyper.com to complete your onboarding
- Tag your campaign content with @acmesportsgives, #ACME4CleanWater

⋮

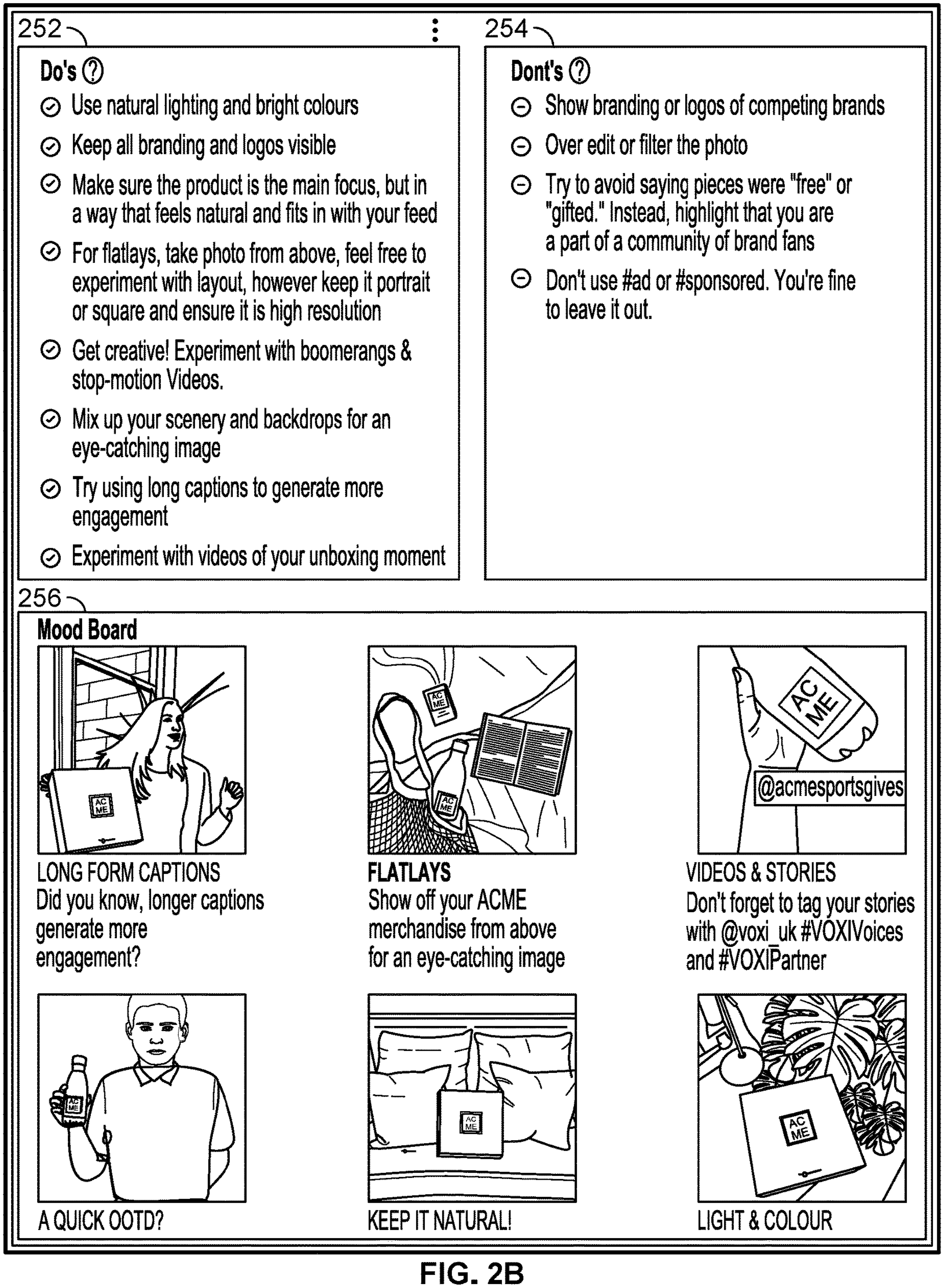

Do's ⓘ
- ⊙ Use natural lighting and bright colours
- ⊙ Keep all branding and logos visible
- ⊙ Make sure the product is the main focus, but in a way that feels natural and fits in with your feed
- ⊙ For flatlays, take photo from above, feel free to experiment with layout, however keep it portrait or square and ensure it is high resolution
- ⊙ Get creative! Experiment with boomerangs & stop-motion Videos.
- ⊙ Mix up your scenery and backdrops for an eye-catching image
- ⊙ Try using long captions to generate more engagement
- ⊙ Experiment with videos of your unboxing moment

254

Dont's ⓘ
- ⊖ Show branding or logos of competing brands
- ⊖ Over edit or filter the photo
- ⊖ Try to avoid saying pieces were "free" or "gifted." Instead, highlight that you are a part of a community of brand fans
- ⊖ Don't use #ad or #sponsored. You're fine to leave it out.

256

Mood Board

LONG FORM CAPTIONS
Did you know, longer captions generate more engagement?

FLATLAYS
Show off your ACME merchandise from above for an eye-catching image

VIDEOS & STORIES
Don't forget to tag your stories with @voxi_uk #VOXIVoices and #VOXIPartner

A QUICK OOTD?

KEEP IT NATURAL!

LIGHT & COLOUR

```
{
  "data": {
    "id": "1574083",
    "username": "snoopdogg",
    "full_name": "Snoop Dogg",
    "profile_picture": "http://distillery.s3.amazonaws.com/
                         profiles/profile_1574083_75sq_1295469061.jpg",
    "bio": "This is my bio",
    "website": "http://snoopdogg.com",
    "is_business": false,
    "counts": {
      "media": 1320,
      "follows": 420,
      "followed_by": 3410
    }
  }
}
```

400

| | | |
|---|---|---|
| 402 | media_type: | text |
| 404 | media_url: | text |
| 406 | ig_link: | text |
| 408 | caption: | text |
| 410 | likes_count: | int |
| 412 | comments_count: | int |
| 414 | location_id: | text |
| 302 | user_id: | bigint |
| 416 | created_time: | timestamp |
| 418 | id: | bigint |
| 420 | hashtags: | text |
| 422 | views_count: | int |

FIG. 4A

```
{
    "data": [{
        "comments": {
             "count": 0
        },
        "caption": {
            "created_time": "1296710352",
            "text": "Inside le truc #foodtruck",
            ...
        },
        "likes": {
             "count": 15
        },
        "link": "http://instagr.am/p/BWrVZ/",
        "user": {
            "username": "kevin22",
            ...
        },
   "created_time": "1296710327",
        "images": {
            "low_resolution": {
             ...
            },
            "thumbnail": {
             ...
            },
            "standard_resolution": {
                "url": "http://distillery.s3.amazonaws.com/media/2011/02/02/
6ea7baea55774c5e81e7e3e1f6e791a7_7.jpg",
                "width": 612,
                "height": 612
            }
        },
        "type": "image",
        "users_in_photo": [],
        "filter": "Earlybird",
        "tags": ["foodtruck"],
        "id": "22721881",
        "location": {
            "latitude": 37.778720183610183,
            "longitude": -122.3962783813477,
            "id": "520640",
            "street_address": "",
            "name": "Le Truc"
        }
    },

        "comments": {
            "count": 2
        },
        "caption": null,
        "likes": {
            "count": 1
        },
       ...
        "location": null
    },
   ]
}
```

```
"responses": [
  {
    "labelAnnotations": [
      {
          "mid": "/m/017rgb",
          "description": "ferris wheel",
          "score": 0.84832066
      },
      {
          "mid": "/m/010jjr",
          "description": "amusement park",
          "score": 0.8101249
      },
      {
          "mid": "/m/01d74z",
          "description": "night",
          "score": 0.8036025
      },
      {
          "mid": "/m/05b0n7k",
          "description": "outdoor recreation",
          "score": 0.68825835
      },
      {
          "mid": "/m/02jf28",
          "description": "fair",
          "score": 0.6566326
      }
    ]
```

```
"responses": [
  {
    "logoAnnotations": [
      {
        "mid": "/m/045c7b",
        "description": "Google",
        "score": 0.32291126,
        "boundingPoly": {
          "vertices": [
            {
              "x": 63,
              "y": 18
            },
            {
              "x": 123,
              "y": 18
            },
            {
              "x": 123,
              "y": 38
            },
            {
              "x": 63,
              "y": 38
            }
          ]
        }
      }
    ]
  }
]
```

FIG. 6

```
from keras.layers import Dense, ZeroPadding2D, Dropout, Flatten, \
    Conv2D, MaxPool2D
from keras.models import Sequential
from keras.optimizers import SGD


model = Sequential()
model.add(ZeroPadding2D((1, 1), input_shape=(224, 224, 3)))
model.add(Conv2D(64, (3, 3), activation='relu', padding='same'))
model.add(Conv2D(64, (3, 3), activation='relu', padding='same'))
model.add(MaxPool2D((2, 2), strides=(2, 2)))

model.add(Conv2D(128, (3, 3), activation='relu', padding='same'))
model.add(Conv2D(128, (3, 3), activation='relu', padding='same'))
model.add(MaxPool2D((2, 2), strides=(2, 2)))

model.add(Conv2D(256, (3, 3), activation='relu', padding='same'))
model.add(Conv2D(256, (3, 3), activation='relu', padding='same'))
model.add(Conv2D(256, (3, 3), activation='relu', padding='same'))
model.add(MaxPool2D((2, 2), strides=(2, 2)))

model.add(Conv2D(512, (3, 3), activation='relu', padding='same'))
model.add(Conv2D(512, (3, 3), activation='relu', padding='same'))
model.add(Conv2D(512, (3, 3), activation='relu', padding='same'))
model.add(MaxPool2D((2, 2), strides=(2, 2)))

model.add(Conv2D(512, (3, 3), activation='relu', padding='same'))
model.add(Conv2D(512, (3, 3), activation='relu', padding='same'))
model.add(Conv2D(512, (3, 3), activation='relu', padding='same'))
model.add(MaxPool2D((2, 2), strides=(2, 2)))

model.add(Flatten())
model.add(Dense(4096, activation='relu'))
model.add(Dropout(0.5))
model.add(Dense(4096, activation='relu'))
model.add(Dropout(0.5))
model.add(Dense(12, activation='softmax')) # Final Layer
```

802

```
sgd = SGD(lr=1e-3, decay=1e-6, momentum=0.9, nesterov=True)

model.compile(optimizer=sgd, loss='categorical_crossentropy',
metrics=['accuracy'])
```

"Hey {name}, Loving your profile aesthetic! We have an exclusive partnership with @brand allowing us to work with creatives like you to design and sell your own sneaker collection. We'd like to invite you to be a part of the next Brand (www.brand.com) drop. If you want to join this exclusive team of creators, send us your email address or contact us by tomorrow, August 15th, via brand@zyper.com for more details. You can also just download the Zyper app for your phone and follow the instructions there. Can't wait to hear from you.", 1004 1006

"Hey {name}, Loving your profile aesthetic! We have an exclusive partnership with @brand allowing us to work with creatives like you to design and sell your own sneaker collection. We'd like to invite you to be a part of the next Brand (www.brand.com) drop. If you want to join this exclusive team of creators, please download the Zyper app for your phone and follow the instructions there."

Hey! We've found your Instagram profile and would love to send you an exclusive hamper of products! We're working with Zyper to build a community of top beauty fans and we want you to be one of them. Pass along your email address or email us directly at brand@zyper.com for more info on the campaign. Thanks! :)", "Hey {name}, we love your feed!

We are working with Zyper to build a community of 200 of our top beauty fans to send an exclusive selection of products to create Instagram content with. We'd love to have you involved! To hear more about the campaign, let us know your email address or drop an email to brand@zyper.com - Thanks! x"

1202 — Campaign Overview
1204 DATE RANGE — Campaign to date
1218

PERFORMANCE
- 6.2% UGC Engagement
- 17,418 Total Likes
- 914 Total Comments
- 2,804 Bio Link Clicks COMMUNITY
- 411 Fans in Community 1206
- 653 UGC Created
- 798,410 Reach

Latest Campaign UGC — VIEW ALL

1220 Onboarded Fans
411 / 400 — 1208 — VIEW ALL

Community Reach — 1210
800k / 600k / 400k / 200k / 0k — Nov 18 — Dec 18

Campaign UGC — 1212
600 / 400 / 200 / 0 — Nov 18 — Dec 18

Your Social Growth — 1214
- 9,714 Followers ▲63 From Prior Week
- 51:1 Follower Ratio 1216
- 0.0% Engagement Rate
- 0.0 Average Likes
- 0.0 Average Comments

Trending in the community
#homeexercises #autumnfashion #autumnstyle #ootd #fabletics
#flatlay #loislovesfitness #blondehair #discoverunder5k #ACME
#london #babesofinstagrame #crunchynut #beauty #feature
#Water #kelloggs #homeworkouts_4u #breakfastgoals #igdaily
...

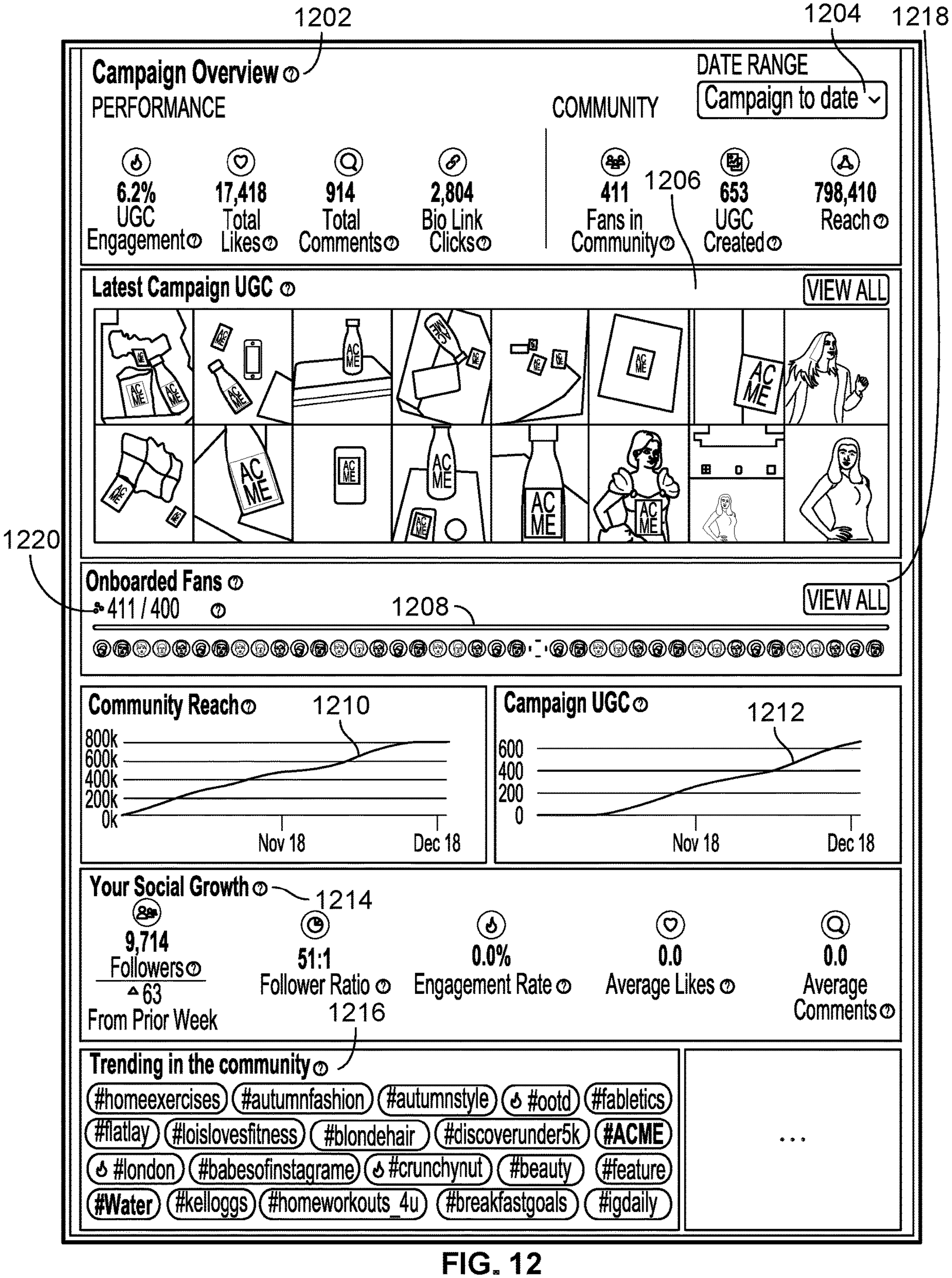

Search here

Onboarded Fans: 411

| FAN NAME | FOLLOWER COUNT | FOLLOWING COUNT | MEDIA COUNT |
|---|---|---|---|
| Dianne Smith | 1618 | 3358 | 1890 |
| Phoebe Jones | 1084 | 745 | 36 |
| Jana Thomas | 2176 | 975 | 842 |
| Daniel Fredrick | 1272 | 908 | 182 |
| Abby Siyan | 1120 | 870 | 508 |
| Lucky King | 536 | 650 | 99 |
| Katerina Mae | 2338 | 998 | 283 |
| Demi Orr | 1025 | 716 | 124 |
| Daisy Fernandez | 1570 | 449 | 870 |
| Lee Tien | 2138 | 441 | 284 |
| Fred Nakamoto | 7416 | 1366 | 525 |
| Rosa Sanchez | 1115 | 463 | 357 |

FIG. 13

| | |
|---|---|
| code | XYZ |
| media_type | story |
| media_url | https://... |
| ig_link | http://instagram.com/p/XYZ/ |
| caption | Phone has been dead so didn't get a chance to take any pics but was such a good evening hearing @chris_riddell talk about his Poems to Live Your Life By anthology. Beautiful collection by this talented man, would be a perfect Christmas gift! |
| likes_count | 0 |
| comments_count | 0 |
| location_id | |
| candidate_id | 1234567 |
| created_time | 2018-12-04 23:33:50 |
| pk | 12345678901234567 89 |
| fan_id | 123 |
| created_at | 2018-12-05 09:20:30.49207 |
| updated_at | 2018-12-05 23:28:44.482439 |
| campaign_ugc | f |
| persisted_on_s3 | t |
| video_url | |
| views_count | |
| enrollment_id | |
| album | |

FIG. 15

```
id                | 123
ugc_id            | 1234567890123456789
logo_processed    | t
logo_found        | f
from_s3           | t
logo_meta         | []
created_at        | 2018-03-13 00:34:10.358891
updated_at        | 2018-09-28 19:26:04.138612
object_processed  | t
object_found      | t
object_meta       | [{"mid": "/m/09j2d", "score": 0.9747709035873413,
"topicality": 0.9747709035873413, "description": "clothing"}, {"mid":
"/m/083jv", "score": 0.9610912203788757, "topicality": 0.9610912203788757,
"description": "white"}, {"mid": "/m/0fly7", "score": 0.8837081789970398,
"topicality": 0.8837081789970398, "description": "jeans"}, {"mid":
"/m/06rrc", "score": 0.8221310377120972, "topicality": 0.8221310377120972,
"description": "shoe"}, {"mid": "/m/01ssh5", "score": 0.8199443221092224,
"topicality": 0.8199443221092224, "description": "shoulder"}, {"mid":
"/m/031974", "score": 0.7777693867683411, "topicality": 0.7777693867683411,
"description": "waist"}, {"mid": "/m/04nk04", "score": 0.7419874072070489,
"topicality": 0.7419874072070489, "description": "leggings"}, {"mid":
"/m/0hgr6", "score": 0.7227209806442261, "topicality": 0.7227209806442261,
"description": "denim"}, {"mid": "/m/00y7p8", "score": 0.6843297481536865,
"topicality": 0.6843297481536865, "description": "abdomen"}, {"mid":
"/m/05r655", "score": 0.6747238636016846, "topicality": 0.6747238636016846,
"description": "girl"}]
hashtags_processed | t
image_persisted   | 1
video_persisted   | 0
style_processed   | t
style_found       | t
style_meta        | [{"class": 8, "score": 0.733359754008554008,
"description": "Selfie"}, {"class": 2, "score": 0.2520571053028106 7,
"description": "Person_Solo"}, {"class": 3, "score": 0.0083714975044131 28,
"description": "People_Group"}, {"class": 11, "score":
0.004090176429599 5235, "description": "Collage"}, {"class": 1, "score":
0.0010876198066398501, "description": "Flatlay"}, {"class": 9, "score":
0.0006297167274169624, "description": "Architecture"}, {"class": 7, "score":
0.0001813286799006164, "description": "Animals"}, {"class": 4, "score":
0.0000706705905031412 8, "description": "Food"}, {"class": 0, "score":
0.0000500078749610 1111, "description": "Product_Shot"}, {"class": 5,
"score": 0.0000413561429013 4981, "description": "Sky"}, {"class": 10,
"score": 0.0000366932908946 1826, "description": "Nature"}, {"class": 6,
"score": 0.0000240605586441 23375, "description": "Landscape"}]
carousel_persisted |
color_processed   | f
color_found       | f
color_meta        | []
```

FIG. 16

```
id                       | 2040
pk                       | 324962366
username                 | cclarasole
full_name                | CLARA SOLÉ
gender                   | female
location                 |
age                      | 0
profile_pic_url          | https://...
is_verified              | f
is_private               | f
biography                | If you're going to be happier, do it
external_url             |
media_count              | 539
following_count          | 1005
follower_count           | 2983
created_at               | 2018-02-12 22:46:07.410561
updated_at               | 2018-12-06 05:10:35.16649
active                   | t
stories_updated_at       | 2018-12-06 02:32:17.400100
email                    | test@zyper.com
source                   |
state                    |
telephone                |
age_bracket_id           |
twitter_url              |
facebook_url             |
linkedin_url             |
occupation               |
status                   | good
date_of_birth            |
submit_date              |
obsessions_notes         |
influential_notes        |
favorites_notes          |
real_name                | Zyper
community_manager_notes  |
s3_profile_pic_url       | https://...
primary_address          | {"city": null, "state": null, "country": null,
"postcode": null, "address_line_1": null, "address_line_2": null}
secondary_address        | {"city": "", "state": "", "country": "",
"postcode": "", "address_line_1": "", "address_line_2": ""}
skills                   | []
skills_to_learn          | []
description              |
```

FIG. 17

```
pk              | 1234567890
username        | username
full_name       | ▓ The KinG ▓
profile_pic_url | https://scontent-lhr3-
1.cdninstagram.com/vp/fb8f427029a28942ff93866003c3df86/5C3EA994/t51.2885-
19/s320x320/26186481_2294000877602939_7100403821662175232_n.jpg
is_verified    | f
is_private     | f
biography      | ▓ ✕ ThE KinG Barber ▓●▓
               +
               | ▓#GuasmoSurBl1▓
               +
               | ▓King de una Sola Queen▓
               +
               | Wasatp: X interno
               +
               | ▓ ThE KinG' ▓
               +
               | ♥17/07/16▓♥
external_url   | https://...
media_count    | 62
follower_count | 1325
following_count| 5916
active         | t
updated_at     | 2018-09-29 23:19:05.290433
created_at     | 2018-05-29 04:28:13.10465
gender         | unknown
source         |
messaged_from  | {}
predicted_meta | {}
```

FIG. 18

```
id                              | 1
name                            | BRAND
cost_per_fan                    | 100 GBP
start_date                      | 2017-11-29
goal_active_fans                | 200
goal_ugcs                       | 600
goal_engagement                 | 10
goal_reach                      | 250000
brand_id                        | 12
created_at                      | 2017-12-11 18:31:39.775831
updated_at                      | 2018-06-02 11:47:28.744544
end_date                        | 2018-03-31 23:00:00
product_category                | Beauty & Cosmetics
mode                            | visible
campaign_type                   | normal
hashtag_stat_interval_starts_at |
require_review                  | f
contract_value                  | 1
editable                        | f
briefing_completed              | t
inactive_at                     |
mailchimp_list_id               |
requires_logistics              | f
link_tracking                   | f
```

FIG. 19

| | |
|---|---|
| id | 28807 |
| fan_id | 31250 |
| campaign_id | 27 |
| campaign_segment_id | 25 |
| start_date | 2018-06-14 00:00:00 |
| end_date | |
| created_at | 2018-06-15 08:38:40.658827 |
| updated_at | 2018-06-15 08:38:40.658827 |
| goal_images | 9 |
| goal_videos | 0 |
| goal_stories | 3 |
| biography_match | |
| active | t |
| terms_conditions_accepted | f |
| campaign_newsletter_optin | f |

FIG. 20

| | | |
|---|---|---|
| id | \| | 4217028 |
| name | \| | style:landscape |
| taggings_count | \| | 264899 |

FIG. 21A

| | | |
|---|---|---|
| id | \| | 21649789 |
| tag_id | \| | 4217028 |
| taggable_type | \| | Ugc |
| taggable_id | \| | 1234567890123456789 |
| tagger_type | \| | |
| tagger_id | \| | |
| context | \| | tags |
| created_at | \| | 2018-09-28 16:47:38.754903 |

FIG. 21B

PLATFORM FOR LOCATING AND ENGAGING CONTENT GENERATORS

CROSS REFERENCE TO OTHER APPLICATIONS

This application claims priority to U.S. Provisional Patent Application No. 62/777,609 entitled IDENTIFYING MICRO-INFLUENCERS filed Dec. 10, 2018 which is incorporated herein by reference for all purposes. This application also claims priority to U.S. Provisional Patent Application No. 62/823,331 entitled PLATFORM FOR LOCATING AND ENGAGING CONTENT GENERATORS filed Mar. 25, 2019 which is also incorporated herein by reference for all purposes.

BACKGROUND OF THE INVENTION

Historically, well-known spokespeople have been employed to endorse products and services in national (and international) campaigns that make use of a variety of legacy media. For example, a famous actress might be hired to promote a particular type of beverage (e.g., in a television advertisement), and an Olympic athlete might be hired to endorse a particular sporting good brand (e.g., in a magazine). Increasingly, individuals are relying less on legacy media and more on online media for news and information such as which products and services to try. Further, in contrast with a long-established publishing entity (e.g., a television network or a newspaper), much of the content being consumed by modern individuals is authored by comparatively unknown amateurs (e.g., who publish original written content on blogs). In contrast to a legacy model where companies can work with agents to locate appropriate spokespeople, it can be challenging for a modern company to identify amateurs as prospective spokespeople. The imposition by modern publishing platforms of technical limitations on gaining access to such amateurs can further complicate the situation.

BRIEF DESCRIPTION OF THE DRAWINGS

Various embodiments of the invention are disclosed in the following detailed description and the accompanying drawings.

FIGS. 2A and 2B depict an example of campaign guidelines as rendered in an interface.

FIG. 4A illustrates an embodiment of a user generated content (UGC) record.

FIG. 4B illustrates an example of excerpts of a payload.

FIG. 6 illustrates an example format returned in response to an API call using an image.

FIG. 8 shows the structure of an example image style classification model.

FIGS. 10A and 10B show examples of messages.

FIG. 12 shows an example of an interface for monitoring a campaign.

FIG. 13 shows an example of an interface for viewing participants in a campaign.

FIG. 15 illustrates an embodiment of a User Generated Content (UGC) Record.

FIG. 16 illustrates an embodiment of a UGC Processing Record (metadata).

FIG. 17 illustrates an embodiment of a Fan Record.

FIG. 18 illustrates an embodiment of a Candidate Record.

FIG. 19 illustrates an embodiment of a Campaign Record.

FIG. 20 illustrates an embodiment of an Enrollment Record.

FIG. 21A illustrates an example of a Tag.

FIG. 21B illustrates an example of a Taggings model.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
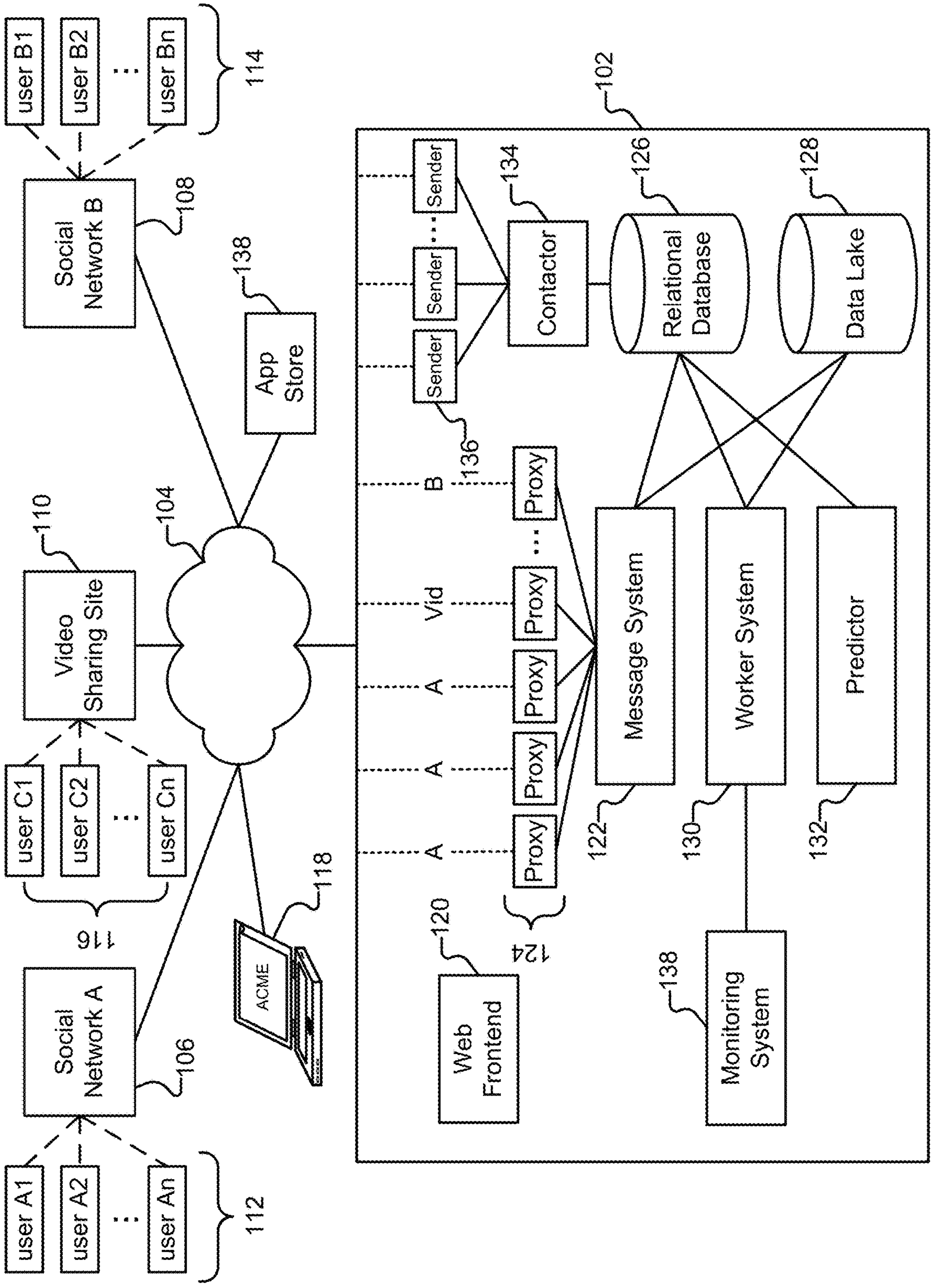
FIG. 1 illustrates an embodiment of an environment in which content generators can be located and engaged.

FIG. 1 illustrates an embodiment of an environment in which content generators can be located and engaged. In the example shown, publishing platforms 106-110 make available resources for their respective users to create/publish content (also referred to herein as "user generated content" or UGC), and also to consume the content of other users. As a first example, social network 106 (also referred to herein as "social network A") has associated with it a set (112) of users (e.g., user A1, user A2, . . . user $A_n$). As a second example, social network 108 (also referred to herein as "social network B") has associated with it a set (114) of users (e.g., user B1, user B2, . . . user Bn). Examples of such social networks include Twitter, Facebook, Pinterest, LinkedIn, Nextdoor, and Instagram. As a third example, video sharing site 110 has associated with it a set (116) of users (e.g., user C1, user C2, . . . user Cn). Examples of such video sharing sites include Dailymotion, YouTube, Veoh, and Vimeo.

The techniques described herein can be used in conjunction with a variety of publishing platforms (of which platforms 106-110 are examples). Accordingly, while reference might be made throughout the Specification to specific interactions with specific platforms (e.g., identifying a user A1 of social network 106, or contacting a user B2 of platform 108), it is to be understood that an example is being described and the approach is generally applicable to any appropriate publishing platform.

Suppose a fictitious sporting good company, hereinafter referred to as ACME Sports, would like to promote its support of clean water charitable organizations through an advertising campaign. One approach ACME could take is to hire an advertising company, which in turn would help ACME hire spokespeople, secure advertising space (e.g., in print and television advertisements), etc. The advertising company might also put together an online campaign, e.g., by publishing content to platforms 106-110 using ACME's accounts on those platforms.

In contrast with professionals, amateur content publishers (also referred to herein as "micro-influencers") are individuals typically with a few hundred followers, high engagement with those followers, who do not sell their services via influencer platforms, and tend to command a high amount of trust within their community. The content generated by such amateurs is often more original and more authentic than content authored by professionals with tens of thousands of followers. The combination of a close-knit community of followers and levels of trust associated with the community means that a post by an appropriate amateur can often be more effective than one by a professional. By connecting dozens or hundreds of such amateurs within a single marketing campaign, an amount of reach similar to that of a traditional advertising campaign can be achieved, but likely with a greater level of engagement (e.g., due to the many diverse pieces of original content authored by quality individuals, as contrasted with a handful of pieces of content authored by an advertising agency and pitched by a celebrity).

Unfortunately, locating micro-influencers on social media platforms is not straightforward. While the number of followers an individual has can be used as a proxy of how "good" of an influencer a particular individual is, the metric does not take into account other factors such as the type of profile, person, or content that is being posted, all of which can factor into how likely it is a given individual will fulfill multiple campaign requirements over an extended time. For example, an individual with 6,000 followers is not necessarily three times as likely to provide compelling content to those 6,000 followers as an individual with 2,000 followers.

One approach ACME could take to encourage users of platforms 106-110 to generate their own content associated with ACME's campaign is to announce a contest asking that people send in photographs of their favorite water-themed locations and selecting a winner. A problem with this approach is that it is passive—it relies on an individual to come across the campaign (e.g., see a print ad, see a commercial, or see a social networking post).

Suppose a fictitious individual, Alice, is an enthusiastic fan of ACME Sports. She follows ACME on various of platforms 106-110 and has her own accounts on platforms 106-110. Alice is a college student, interested in outdoor activities like hiking and camping, and owns a dog. Alice might become aware of ACME's photo contest (e.g., because she sees a post made by ACME Sports on platform 106), but might not bother participating because she is not a professional photographer. She also might miss seeing a post by ACME about the contest (e.g., because she limits the amount of time she spends reading posts made by companies in favor of reading posts made by her friends). Suppose another fictitious individual, Bob, also has various accounts on platforms 106-110, but does not follow ACME on those platforms. He does, however, follow accounts associated with national parks. It is possible that Bob will not be exposed to ACME's clean water campaign at all.

ACME would very much like for individuals like Alice and Bob to know about its commitment to clean water, due to factors such as Alice's enthusiasm for ACME (contrasted with other individuals who merely follow ACME's accounts), and both Alice and Bob's interests in the outdoors. Further, ACME would like individuals like Alice and Bob to help others (e.g., their friends) learn about ACME's commitment to clean water. As will be described in more detail below, ACME can use platform 102 accomplish this. In particular, ACME can use platform 102 to automatically identify and rank individuals for social media campaigns in order of criteria such as of suitability for its brand, vertical, and desired campaign metrics, and can also use platform 102 to invite them to participate in the campaign.

As will be described in more detail below, the techniques described herein use a combination of public profile data and inferred demographic information, as well as post metrics, visual flags, and content to quantify the quality of a profile. Natural language processing and computer vision are combined to analyze the context, style, quality and content (amongs other features) on a post- and user-level to map similarities between them and surface ideal candidate users. As will also be described in more detail below, the processed profile and content data can be used to build a model that can score a user based on the probability of successfully completing a set of tasks. These tasks can vary, but broadly include posting a defined amount of content over a predefined period.

I. Onboarding ACME and Campaign Setup

Depicted in FIG. 1 is a laptop 118 used by an ACME employee (hereinafter "Charlie") to manage ACME's accounts on platforms 106-110. Charlie (either individually, or working on a team with other employees) helps manage ACME's online presence by posting content as ACME on platforms 106-110 and interacting with other users of platforms 106-110 (e.g., answering questions).

Charlie would like to enroll ACME with platform 102, and have platform 102 help promote ACME's clean water campaign. Charlie directs a browser on laptop 118 to a web frontend 120 provided by platform 102. Charlie supplies information such as an account name (e.g., acmesports), a password, and an email address (e.g., admin@acmesportsexample.com), and an account is created for ACME on platform 102. Once the account is created, Charlie is asked to complete profile information about ACME, such as by providing a corporate address, one or more categories associated with ACME (e.g., sporting goods and apparel), etc.

Charlie can now create a campaign for ACME on platform 102 (e.g., by using laptop 118 to interact with a form served by web frontend 120). Charlie provides general information applicable to the campaign, such as a start date (e.g., Jan. 1, 2019), a title (e.g., ACME—Clean Water Campaign), an end date (e.g., May 31, 2019), and any hashtags/accounts that should be used to tag the campaign (e.g., # ACME4CleanWater, # SaveOurWater @acmesports, @acmesportsgives). Charlie is also asked to provide information about how the campaign should work. For example, Charlie is asked to provide a list of the types of rewards individuals should receive for agreeing to help with the campaign. Examples include online or physically mailed vouchers redeemable for products online, for products in person, and/or for experiences. Charlie can further specify what is required to earn the reward. Charlie can also select whether an individual that agrees to help with the campaign should be provided with a personalized trackable discount code link they can include in their profile, a static discount code link, or neither. Additional information provided by Charlie is described in conjunction with FIGS. 2A, 2B, and 2C below.

As Charlie interacts with platform 102 via web frontend 120 he can be provided with various help/suggestions on how to create the campaign as applicable. As an example, when deciding on incentives, Charlie can be provided with a suggestion that the value of the reward be approximately $100 and be given to the individual in exchange for posting three pieces of content during the duration of the campaign.

Figure 2A:
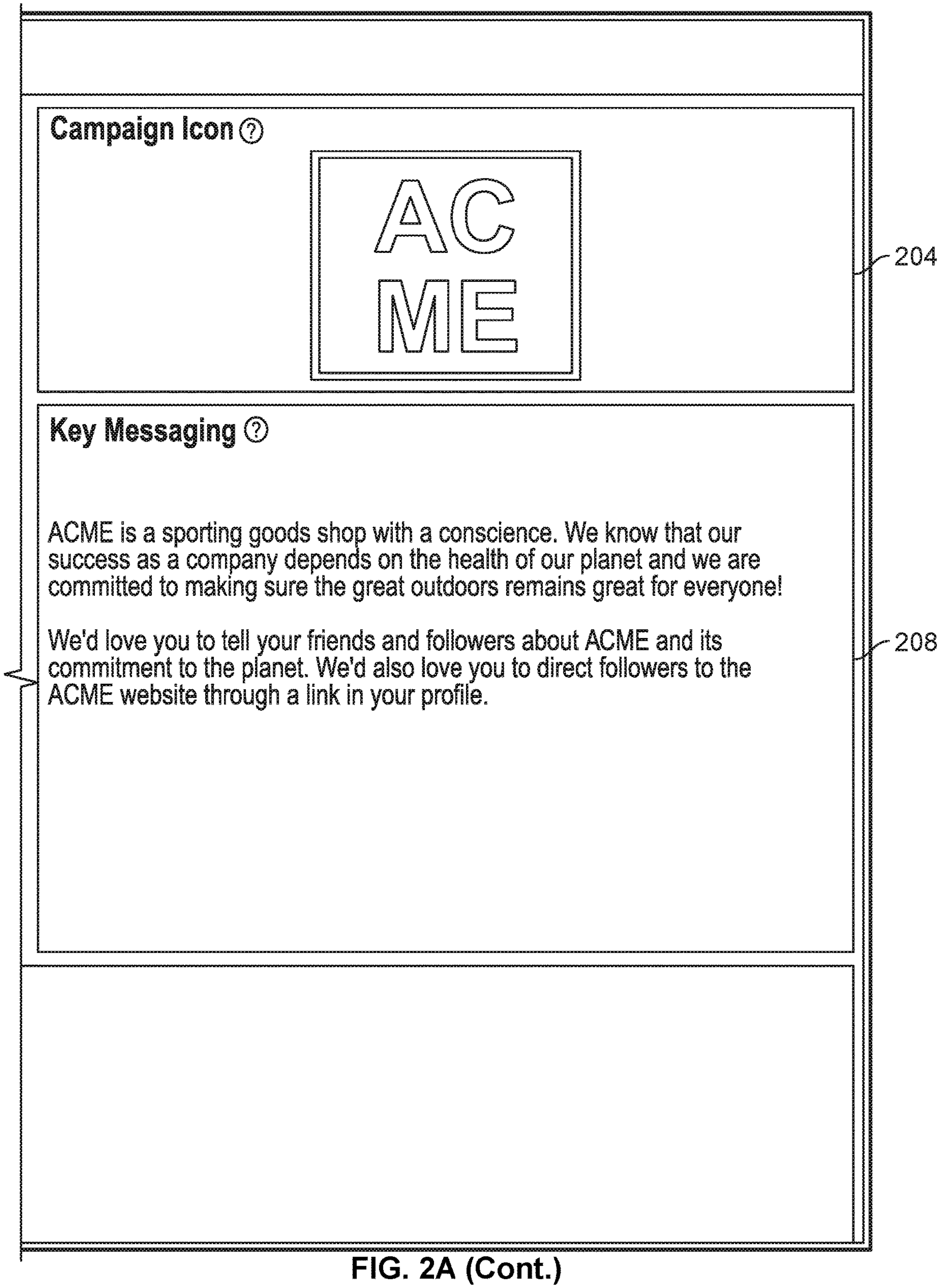

An example of campaign guidelines as rendered in an interface is shown in FIGS. 2A and 2B. In particular, FIGS. 2A and 2B depict, collectively, examples of guidance an individual, once selected to participate in a campaign, will see regarding campaign participation (e.g., in a web browser, or in an app configured to display information to the individual). In region 202, the individual can download custom wallpaper to use with their profile(s) on platforms 106-110, formatted to the correct height and width requirements of the applicable platform (e.g., provided to platform 102 by Charlie). Region 204 depicts an icon the individual can use, as applicable, in UGC (e.g., as provided to the platform by Charlie). Region 206 depicts copy (e.g., written by Charlie, or formulaically generated based on information provided by Charlie) instructing individuals about how the campaign will work. Region 208 depicts messaging (e.g., provided by Charlie) that individuals should keep in mind when authoring UGC. Region 210 depicts the rules (e.g., written by Charlie or formulaically generated based on information provided by Charlie) for successfully participating in the campaign (and earning rewards). Regions 252 and 254 depict, collectively a set of tips (e.g., written by Charlie and/or provided automatically by platform 102) to individuals when authoring UGC. Region 256 provides additional tips and depicts examples of photographs (e.g., supplied by Charlie) to inspire individuals when authoring their own UGC.

Figure 2C:
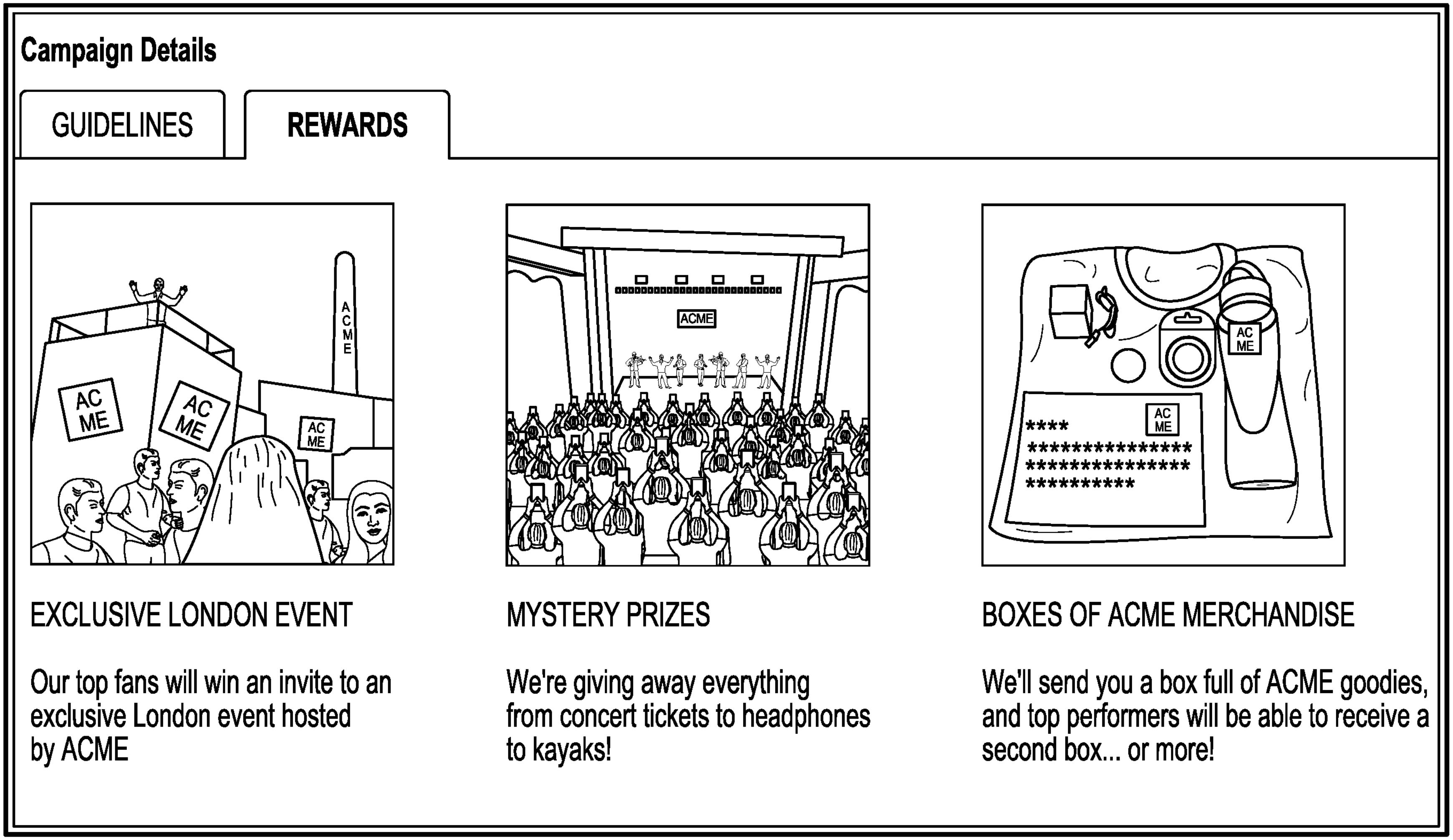
FIG. 2C depicts an example of campaign reward information as rendered in an interface.

FIG. 2C depicts an example of campaign rewards as rendered in an interface. In particular, FIG. 2C shows an individual examples of rewards they might receive if they successfully complete ACME's clean water campaign.

In addition to supplying information about the campaign, Charlie also provides platform 102 (e.g., by using laptop 118 to interact with a form served by web frontend 120) with characteristics/attributes of individuals that ACME would like to target to participate in the campaign. The following are examples of such characteristics/attributes and sample answers provided by ACME with respect to its clean water campaign (including leaving some answers blank, if applicable). As will be described in more detail below, the answers can variously be used as direct queries, and can also be used indirectly to help identify targets.

- accounts that the target individual follows (ACME lists national park accounts, accounts of clean water charitable organizations, accounts of more broadly-focused environmental charities, and accounts of celebrities known to promote charitable outdoors organizations, e.g., famous rock climbers, and an automotive company popular with ski and snow enthusiasts).
- accounts that the target individual should not follow (ACME leaves blank, but could optionally list accounts likely to be unappealing to its targets, such as oil exploration companies, irresponsible seafood vendors, etc.).
- location (ACME wants to run a worldwide campaign, and so leaves this value blank. ACME could also enter information such as a country, a state, a city, a postal code, etc. (or set of any of these)).
- language primarily spoken (ACME selects English, French, and Spanish).
- venues the target likes (ACME lists hashtags, accounts, location names, etc. of places such as national parks, etc.).
- profession (ACME leaves blank).
- activities (ACME lists camping, fishing, hiking, etc.).
- sample accounts of individuals likely to be good targets (ACME lists a handful of individuals who frequently post about outdoor activities).
- age (ACME chooses 18-24 and 25-34 from a list of options).
- gender (ACME leaves blank. ACME could also specify a specific gender, and could also indicate one or more ratios of accounts to target (e.g., 40% of targets should be male)).
- aesthetic choices (ACME chooses "selfies," "landscapes," and "cool tones" from a variety of options. Additional information about aesthetic choices is provided in more detail below).
- competitors (ACME lists accounts of other sporting goods stores).

II. Architecture

Returning to FIG. 1, in various embodiments, platform 102 is distributed system that can scale arbitrarily depending on the volume of data being processed. Whenever platform 102 is described as performing a task, a single component, a subset of components, or all components of platform 102 may cooperate to perform the task. Similarly, whenever a component of platform 102 is described as performing a task, a subcomponent may perform the task and/or the component may perform the task in conjunction with other components. Further, as used herein, a "component" need not be a hardware component, but can also be provided by one or more scripts authored in an appropriate scripting language (e.g., Python), libraries, packages, etc. executing on commodity server-class or other hardware. In various embodiments, portions of platform 102 are provided by one or more third parties. Depending on factors such as the amount of computing resources available to platform 102, various logical components and/or features of platform 102 may be omitted and the techniques described herein adapted accordingly. Similarly, additional logical components/features can be included in embodiments of platform 102 as applicable.

Included in platform 102 is a message system 122. The message system processes a queue of tasks and distributes them over a set of proxy servers (124) to manage/minimize the workload on any individual proxy server. Additional proxies can be created as needed (e.g., by creating AWS EC2 t2.nano instances) and removed when not. One example of a task performed by proxy servers 124 include accessing profile information (e.g., profiles of users 112 on platform 106; profiles of users 114 on platform 108; and profiles of users 116 on platform 110). Other examples of tasks performed by proxy servers 124 include downloading UGC.

Information retrieved by proxy servers 124 is stored variously in relational database 126 (e.g., PostgreSQL) or data lake 128 (e.g., one or more AWS S3 buckets). For example, metadata and textual information can be stored, as records, in database 126, while photographs and video objects can be stored in data lake 128. Worker system 130 consumes data stored in both database 126 and data lake 128 for a variety of processes (e.g., via a plurality of workers executing python scripts to process the data). Examples of processing performed by worker system 130 include (with reference to a user A1 on platform 106) processing profile/biographical information for user A1, processing the textual content of posts made by user A1, determining an image style used by user A1 in content, determining colors used by user A1 in content, determining brands/logos appearing in user A1's content, determining the kinds of objects included in user A1's content, and determining user A1's gender. Results of processing performed by worker system 130 are also stored in database 126 as User records (e.g., a record stored in database 126 for user A1 on platform 106) and UGC records associated with the user. Predictor 132 evaluates records stored in database 126 and determines, for a given campaign, which users of platforms 106-110 would be the best candidates to invite to participate in the campaign.

In various embodiments, message system 122, worker system 130, and predictor 132 are services (e.g., implemented using a set of python scripts) collocated on a t2.2xlarge instance executing an appropriate operating system (e.g., BSD/Linux).

III. Data Structures and Processing

Platform 102 makes use of two main data record types—a User record, and a UGC record. As will be described in more detail below, for a given User record or UGC record, some of the information will be directly obtainable (e.g., from information made publicly available by platforms 106-110). Other information will be inferred, or calculated/generated, as applicable.

A. User Record

Figures 3A, 3B:
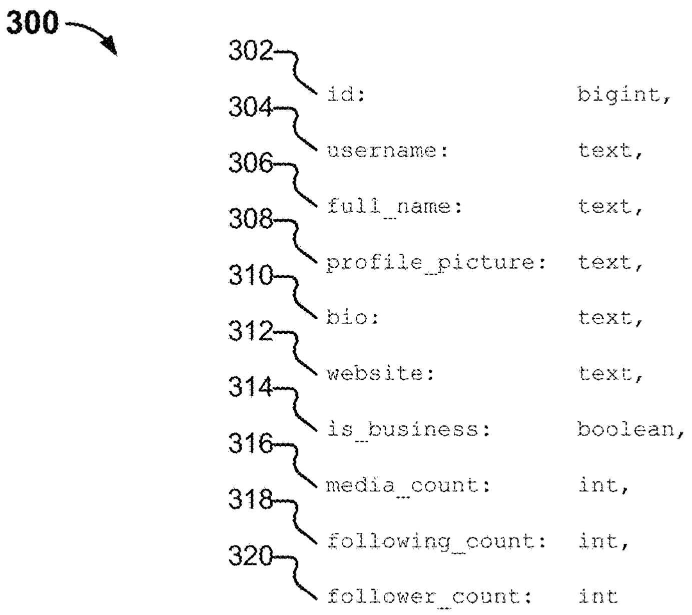
FIG. 3A illustrates an embodiment of a User record.
FIG. 3B illustrates an example of a payload.

FIG. 3A illustrates an embodiment of a User record. In various embodiments, platform 102 maintains a record (based on record 300) on a per-user, per-platform basis. For example, if Alice has an account with platform 106 (e.g., as user A424) and platform 108 (e.g., as user B227), two records for Alice might ultimately be created in database 126 for Alice. To aid in understanding, user accounts on platforms 106-110 are referred to using the word, "user," in lowercase. A corresponding record on platform 102 for the user will be referred to using the word, "User," in uppercase. For example, when processing is performed by platform 102 on the profile of "user A1" of platform 106, a resulting record for "User A1" will be used. As will be described in more detail below, a "Candidate" is a User that is not yet in a campaign (but may have been identified as suitable, or considered potentially suitable). A "Fan" is a User that has enrolled in a campaign (i.e., a Candidate that has been selected for a campaign and agreed to participate in the campaign).

Examples of data that can be included in the User record are:

- unique identifier assigned by the platform for the user (302)
- username on the platform (304)
- full name on the platform (306)
- a link to the account's profile picture (308)
- the user's biography on the platform (310)
- a website included in the user's bio (if present) (312)
- whether the account belongs to a business (314)
- the number posts (UGC) made by the user on the platform (316)
- the number of accounts the user follows on the platform (318)
- the number of followers the user has on the platform (320)

One way to populate the record shown in FIG. 3A (and create a User record for storing in database 126) is to make an API call to the appropriate platform for information about a particular user. In the following discussion, references will be made to Instagram API calls and data processing. As discussed above, platform can process data from a variety of platforms 106-110 using embodiments of the techniques described herein, and is not limited to the processing of Instagram user/content data.

Using Instagram as an example, a given user's profile can be accessed via a GET request to: https://api.instagram.com/v1/users/self/?access_token=ACCESS-TOKEN As explained in Instagram's official documentation available at https://www.instagram.com/developer/endpoints/users/(which uses the example account 'snoopdog'), this returns a payload with the format shown in FIG. 3B. The payload is normalized, with the column descriptions and data formats transformed as applicable, and stored as a User record in database 126.

B. UGC Record

FIG. 4A illustrates an embodiment of a UGC record. In various embodiments, platform 102 maintains a record (based on record 400) on a per-item, per-platform basis. For example, if Alice has an account with platform 106 and authors six pieces of content, six records might ultimately be created in database 126 for Alice's content. Examples of data that can be included in the data record are:

- type of media (402), e.g. video, image, story
- a link to the media (404)
- a link to the content on the platform (406)
- a caption (408)
- a count of the number of likes it has received (410)
- a count of the number of comments it has received (412)
- a geolocation associated with the content (414)
- the unique identifier of the content author on the platform (302), which is the same value as appears in the author's user record on the platform.
- the time at which the content was posted to the platform (416)
- a unique identifier for the content assigned by the platform (418)
- hashtags used in the content (420)
- a count of the number of times the content has been viewed (422)

As with a User record, one way to populate the record shown in FIG. 4 (and create a record for storing in database 126) is to make an API call to the appropriate platform for information. Typically, a user will have a single profile, but multiple UGCs. Platforms may provide a variety of ways for responding to requests for information pertaining UGCs. For example, the platform might support the ability to obtain information about all of a user's UGC with a single request (e.g., all posts made by the user on the platform). As another example, the platform might respond with all posts made in a particular timeframe (e.g., all posts made in the last 90 days), the most recent n posts (e.g., the most recent 30 posts), or with a catalog listing identifiers for each of a user's posts, allowing for subsequent requests to be made for individual content items by referencing appropriate identifiers.

Using Instragram as an example, a given user's content can be accessed via a GET request to: https://api.instagram.com/v1/users/self/media/recent/?access_token=ACCESS-TOKEN, which will return data in JSON format. Examples of excerpts of a payload are depicted in FIG. 4B (with excerpting indicated with ellipses). Region 452 includes data pertaining to a first piece of UGC of a particular user, and region 454 includes data pertaining to a second piece of UGC of the user. If the user has authenticated with the platform and agreed to share access with platform 102, the endpoint can also be called. As with the user profile payload, the UGC payload is normalized. As applicable, image and video content can be downloaded and stored in data lake 128.

C. Additional Analysis/Processing of Records

As mentioned above, some of the information stored (e.g., within records) in database 126 is obtained directly from a platform such as platform 106. Other information is calculated, inferred, or otherwise generated by platform 102.

1. Pre-Processing

In various embodiments, before performing additional analysis/processing on a User's record (e.g., to consider the User for candidacy in a campaign), cut-offs around various profile metrics are imposed to ensure that a minimum standard and experience is achieved, while aligning with the objective of locating/engaging amateur content authors (rather that individuals with a large following such as celebrities).

The following are examples of cutoffs and can be customized as applicable:

- Users with fewer than 50 total posts on a platform.
- Users that have not posted in the last 30 days.
- Users that have fewer than 150 followers or more than 2000 followers.

Users may move in and out of these boundaries as their profile information is updated (i.e., a user that has 130 followers in January may have 170 in March). This pre-filtering stage can either occur after collecting all of the data described in conjunction with FIGS. 3A, 3B, 4A, and 4B, and can also be applied as a hierarchy, cutting profiles when they don't fit into the stated boundaries once the relevant information is available (i.e. if the profile information already indicates that a User will not match the criteria, it is not necessary to collect the User's UGC records).

2. Statistical Information

The following are example features that can be determined by platform 102 and added to User/UGC records in database 126 as applicable:

- Engagement rate per post: This is the number of likes+number of comments divided by the number of followers a user has. This is added as an additional feature to the UGC record (e.g., depicted in FIG. 4A).
- Average post engagement rate: The average of the user's engagement rate per post of the user's most recent 12 posts. This is added as an additional feature to the User record (e.g., depicted in FIG. 3A).
- Follower to Following ratio: The ratio of followers a user has versus the number accounts they are following. This is added as an additional feature to the User record (e.g., depicted in FIG. 3A).

Platform 102 also calculates the following metrics as features of a User and adds them to the User record:

- The number of posts in the last 90 days.
- The ratio of permanent to temporary posts.
- The length of the user's biography (number of words).
- The average length of captions of in the user's UGC: The average number of words used in the captions (e.g., excluding any hashtags and emojis).
- The average number of hashtags used per post.
- Whether the user is followed by other verified users.

3. Gender

In order to effectively determine the suitability of a User for a given campaign, often the gender is important (e.g., a men's shaving brand will likely want to feature male Users as their main demographic). Platform 102 can predict the gender of a User based on the name, using existing lists of first names that have been pre-assigned to a given gender with a certain probability. If the reported probability is lower than 85% the platform documents the outcome "other." This is often the case when a name is not obviously male or female (e.g. Alex, Chris, etc.). The class "other" can also be assigned to Users where no estimate could be made, where no regular name can be determined, or the spelling is not standard (i.e. using a non-Latin alphabet, emojis etc.). An example way for platform 102 to implement gender-related processing is to use the Python package "gender-guesser" available at https://pypi.org/proj ect/gender-guesser/.

4. Object Detection

Figures 5A, 5B:
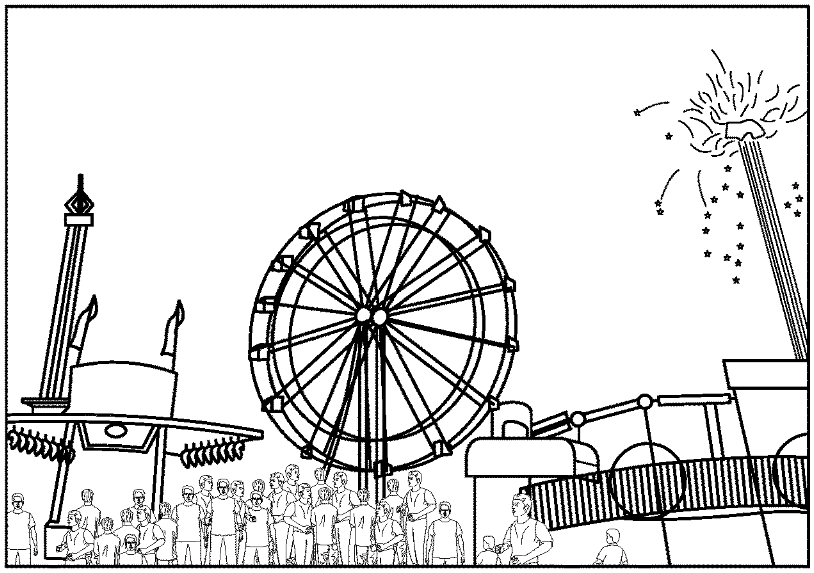
FIG. 5A depicts an example image.
FIG. 5B depicts a list of detected/possible objects appearing in the example image of FIG. 5A.

Platform 102 is configured to use computer vision tools to extract objects that are detected in UGCs. The extracted objects can be used to help classify what Users are posting about. An example approach is for platform 102 to determine which objects are reliably detected in an image using existing APIs (e.g. Google Cloud Vision API, accessed via Python libraries) to obtain probabilities of objects being in the post, including anything that achieves higher than 80% probability. FIG. 5A depicts an example image (from https://cloud.google.com/vision/docs/labels). As illustrated in FIG. 5B, the list of detected and possible objects is large and potentially very detailed and redundant (e.g., with multiple labels indicating the same concept, such as the presence of a fair in the image of 5A, or an alternate example including "Labrador" and "golden retriever" being collapsed into "dog" or "animal" or "outdoor pool" and "indoor pool" being collapsed into "pool" or "water"). In various embodiments, platform 102 uses a dictionary that defines broader categories (e.g., the 100 most-detected object categories) and summarizes similar labels into these. The raw output of the object detection API can also be stored, as applicable, with only the relevant, broader concepts used when performing further analysis/processing on individual UGC records.

Once the consolidated object label(s) have been associated with a User's UGCs, the objects a User has in their UGCs are also assigned to the User, initially as an array field in the database. When training and running a machine learning model for the User (described in more detail below), the array is converted to numerical variables (i.e. indicating the presence (absence) of the "amusement park" label by creating a "amusement park" column with the value 1 (0). One way to achieved this at scale is by using a one-hot encoder, a label/dict encoder, etc. The values can then be weighted according to the frequency with which they occur in a User's UGCs (e.g., with 1 meaning a label appears in every UGC, 0 in none).

5. Brand Detection

Platform 102 is configured to use computer vision tools to extract brands/logos that are detected in UGCs. The extracted brands/logos can be used to help understand pre-existing brand affinities of Users (i.e. which brands feature prominently in a user's feed). An example approach is for platform 102 to determine which brands/logos are reliably detected in an image using existing APIs (e.g. Google Cloud Vision API, accessed via Python libraries) to obtain probabilities of brands/logos being in the post. FIG. 6 illustrates an example format returned in response to an API call using an image.

Analogously to the object detection process, platform 102 can use a dictionary of brands/logos to consolidate multiple spellings, versions, and sub-brands of a given brand (e.g. Coca-Cola, Coke, Diet Coke, etc. all map to Coca-Cola). And, platform 102 can assign all reliably detected brands to a UGC and aggregate all brands found in a User's UGCs into an array associated with that User. Platform 102 can again use a one-hot encoder (or similar) to convert categorical variables into numerical ones for further processing. Platform 102 can again weight these values according to the frequency with which they occur in a User's UGCs (with 1 meaning a logo appears in every UGC, 0 in none).

In the cases where an objective is to find Users for a particular brand (as opposed to more broadly for a product category or vertical) a feature indicating whether a User has posted UGC featuring that brand or not can be included in the User's record.

6. Image Style

Figure 7:
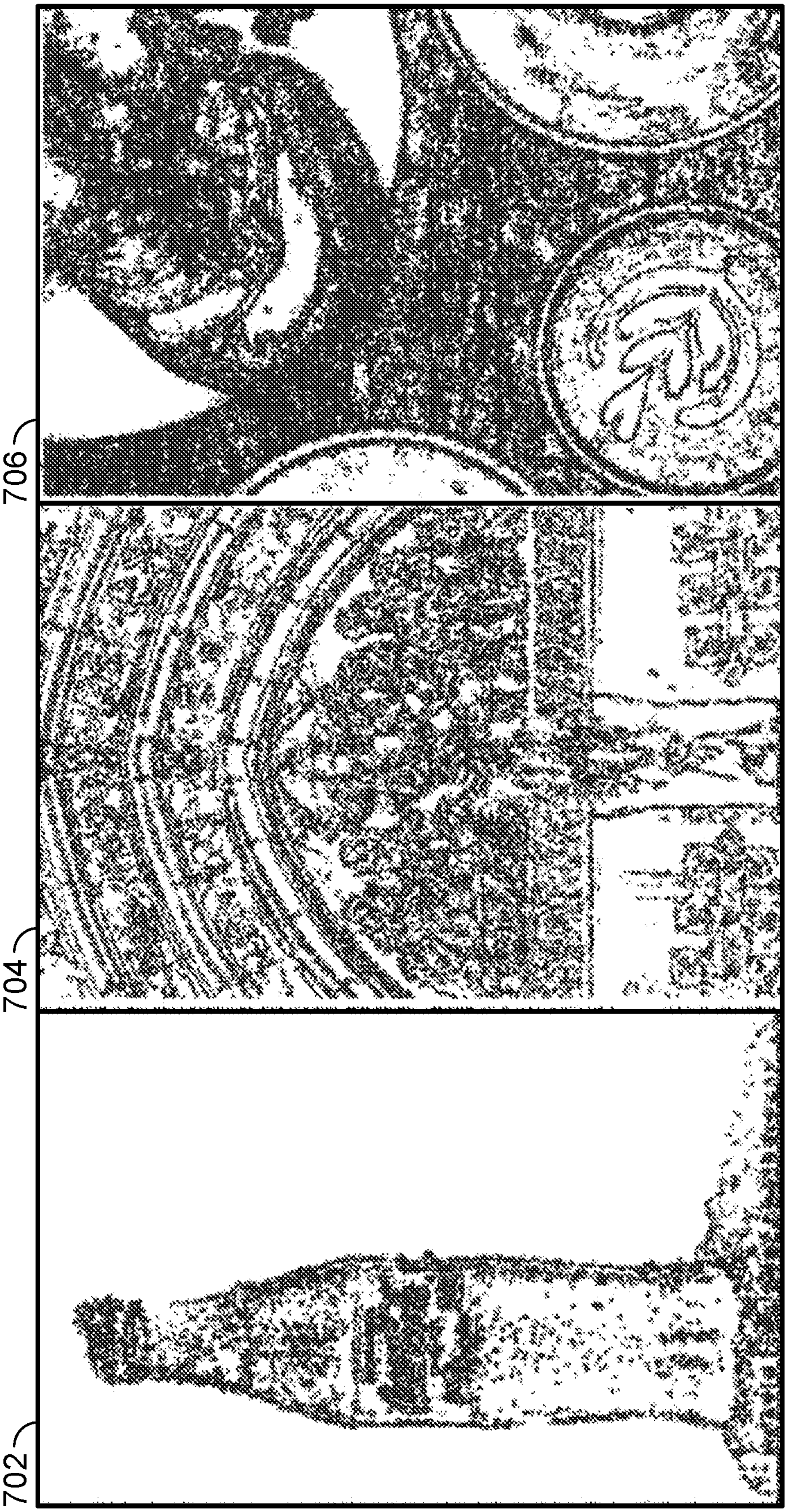
FIG. 7 shows three examples of different image styles.

Images posted to a platform such as platform 106 by a User can be classified into particular styles commonly used in social media. As one example, platform 102 can be configured to classify images appearing in UGCs into one of the following twelve types of styles:

Product Shot
Flatlay
Person Solo
People Group
Food
Sky
Landscape
Animals
Selfie
Architecture
Nature
Collage FIG. 7 shows three examples for different image styles, classified as Product Shot (702), Architecture (704), and Flatlay. One approach to quantifying a generally qualitative assessment of UGC style is to build a deep learning model that can predict the style of an image based on the twelve predefined labels.

An example way to build an adequate training set is to manually label 20,000 posts (evenly distributed across the classes) that are collected from existing Users and randomized public social media profiles. A convolutional neural network (CNN) model is then trained that has 16 weight layers and uses the pre-trained weights from the VGG16 (http://www.robots.ox.ac.uk/~vgg/research/very_deep/) model, which in turn is trained on labeled data from the ImageNet Challenge 2014, which is an image classification plus object localization challenge with 1000 categories.

As platform 102 only classifies images into the above mentioned twelve categories (in some embodiments), a technique known as fine tuning can be used to leverage the trained weights from an existing model (which has to be relevant to the problem, i.e. image labelling), while refining the final dense layer (802) based on the training data, without having to (re)train all layers and weights from scratch, which is computationally expensive. The structure of a resulting model (in Keras syntax) is depicted in FIG. 8.

The final layer (which has 1000 labels instead of the 12 used by platform 102) is replaced after loading the pre-trained weights for the original model. A standard stochastic gradient descent (SGD) method can be used to train the model, while optimizing for accuracy. After this setup and loading the pre-trained weights, the model is trained.

```
model.fit(X, Y,
batch size=16,
epochs=100,
shuffle=True,
verbose=1,
validation_data=(X_v, Y_v),
)
```

Where X, Y ($X_v$, $Y_v$) are the training (validation) data sets. X denotes the set of features for each example image (e.g., for 100 images with 40000 pixels each, this would contain 100×40000 pixel values). Y is the output vector on which the model is trained (e.g., the first entry of Y indicates the labeled outcome for the first image in X). The batch size defines how many samples are processed before the model is updated (16 in this case). The number of epochs defines how often the full data set is passed through the network for training. More epochs means the network can learn the underlying features of the data better, but also means that training takes longer. Both of these hyperparameters can be tuned (varied) to optimize the accuracy of the model. The data sets are randomly sampled from the 20,000 labeled training posts in order to use 80% of them for training and 20% for validation. Validation data is not used for training but used to compare known outcomes with predicted ones to measure the accuracy of the model.

The overall out-of-sample accuracy of this example model is 81.6%. Within individual classes there is some variation:

Product Shot: 97.2%
Flatlay: 79.7%
Person Solo: 84.9%
People Group: 72.6%
Food: 85.2%
Sky: 66.1%
Landscape: 74.0%
Animals: 81.6%

Selfie: 90.0%
Architecture: 87.9%
Nature: 69.0%
Collage: 92.2%

Figure 9:
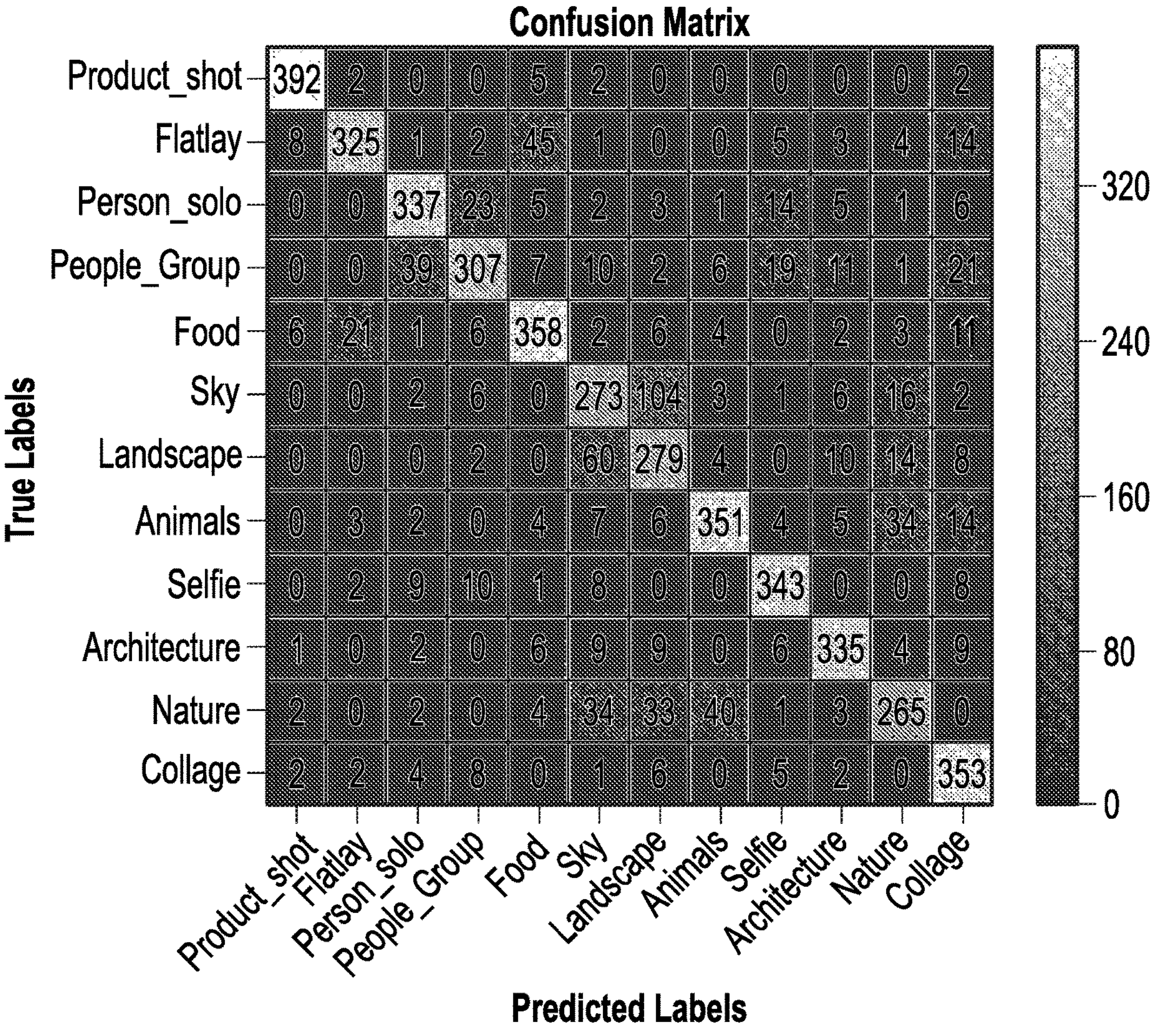
FIG. 9 depicts an example confusion matrix for an image style classifier.

Particularly the classes that overlap conceptually (e.g. Sky, Landscape, Animals, Nature) are more prone to misclassification, whereas more distinct classes (Product Shot, Collage, Selfie) achieve a high-than-average accuracy. This phenomenon can be seen in a confusion matrix of the image style classifier (shown in FIG. 9) which indicates how many validation samples were predicted have a certain class (x-axis) versus their known true class (y-axis). In a perfect model all off-diagonal elements would be zero.

As before, the most probable style for each image UGC can be predicted and aggregated on a User level. The categorical variables can be converted to numerical ones by measuring the fraction of a User's UGCs that are of a particular style (e.g. if a User's posts are 50% Selfies, 30% Nature shots, and 20% Collages, their values for those features would be 0.5, 0.3 and 0.2, respectively, with the remaining nine styles being assigned the weight 0).

7. Image Colors

Similar to Object Detection, Brand Detection, and Image Style, the colors predominantly used in a User's UGC can be analyzed by platform 102 using image analysis tools. One example of such a tool is a script that uses the python imaging library. As applicable, platform 102 can assign a dominant color (or set of colors) to a UGC and aggregate all colors found in a User's UGCs into an array associated with that User. Platform 102 can weight the values according to the frequency with which they occur in a User's UGCs.

D. Using Proxies to Collect Data

In some cases, platforms 106-110 make user data readily accessible via one or more APIs. Platforms 106-110 may also employ rate-limiting or other restrictions on the amount of information a third party (e.g., platform 102) can obtain. As one example, platform 106 may allow unlimited requests for user profile information, but restrict the number of posts (UGC) that can be retrieved (e.g., to a particular number such as 100). In some cases, while content such a UGC may be publicly accessible (i.e., the user has not restricted viewing the UGC to particular friends), platform 106 may nonetheless require that an entity requesting access to posts (or more than a threshold number of posts) be logged into platform 106.

As mentioned above, platform 102 includes a message system 122 that processes a queue of tasks and distributes those tasks over a set of proxy servers (124) to manage/minimize the workload on any individual proxy server, and also results in a variety of IP addresses being used to make the requests to one platform, and the requests from a single proxy server to be made, randomly, to a variety of platforms. One example of a task performed by a proxy server is contacting a platform (e.g., platform 106) and fetching profile/UGC data as applicable. Some tasks can be performed anonymously (e.g., accessing a profile), while other tasks require that the proxy server be logged in to platform 106 (e.g., to page through a list of all of the followers of a brand). Message system 122 monitors the workloads of the proxy servers and randomly assigns a given proxy server a given task. The proxy server is configured with a set of rate limits applicable to the task it is performing (e.g., fetching a profile from platform 106 or fetching UGC from platform 108).

As a numerical example, suppose platform 102 needs to make a total of 6,000 requests against platform 106 in a given time frame. Further suppose that platform 102 currently has three proxies available for handling such requests. Message system 122 could assign a batch of 2,000 requests to each of the three proxy servers, which would then proceed to systematically make the requests subject to any rate limits (e.g., one request every minute for 2,000 minutes). If message system 122 determines that more proxy servers are needed (e.g., the job needs to complete in 1,000 minutes) and are not otherwise available to platform 102, message system 122 can cause additional proxy servers to spin up.

E. User Models

A large set of features can be computed for a given User (e.g., based on information stored in the User's User record). Examples of such features include:

Average post engagement rate
Follower to Following ratio
The number of posts in the last 90 days
The ratio of permanent to temporary posts
The length of the biography (number of words)
The average length of captions of UGC
The average number of hashtags used per post
Whether the user is followed by other verified users
Gender
Location (e.g., extracted from profile, or an array based on locations determined for UGCs).
100 features relating to object detection
100 features relating to logo detection
12 features relating to image styles This is a relatively wide dataset, potentially with some redundant or correlated features. In various embodiments, platform 102 applies dimensionality reduction to reduce the complexity of the model while retaining the information content of the features. Example approaches are principal component analysis (PCA), and linear discriminant analysis (LDA), or variations thereof.

The features can be used to build a variety of distinct (or layered) predictive models, depending on the prediction goal. The results of modeling feed into a ranking of Users according to their likely success rate and can be used (e.g., by predictor 132) to eliminate from consideration as candidates to participate in a campaign, those Users that are likely to drop out during the campaign and not complete all requirements.

To build a predictive model, an output variable to train on is needed. Each model is a classification model, which, along with a categorial prediction, provides a probability of belonging to the predicted outcome class. In addition to focusing on positive outcomes, ranking according to probability can be performed. For models with binary outcomes, a variety of approaches can be used, including Logistic Regression, Random Forest Classifiers, and Naïve Bayes. Training and use of models can be performed in an offline fashion, meaning that platform 102 can retrain the model as more data becomes available and can (re-)apply it to Users when necessary.

A first example is a model for finding Users to invite to join a campaign. The data used for training this model takes into account historical profiles and records about whether a User was previously considered by platform 102 for a campaign. The outcome is a binary 1/0 (true/false) variable that can be assigned to all Users. As the negative (0, false) sample will be much larger (relevant Users only constitute a small fraction of the overall list of Users) a random selection of negative samples is taken in order to ensure both classes (1 and 0) have approximately the same number of samples.

In a second model, whether or not a User actually joined a campaign is used as the outcome variable. Again, the outcome is 1 or 0. The sample of Users that are relevant for this use case can be the whole sample of Users, or just the ones that had a positive (1) outcome in the first example. Either way, platform 102 ensures that both classes have similar sample sizes.

In the third model, the outcome variable used is whether Users successfully joined a campaign and completed all the guidelines and requirements within a predefined timeframe (where examples of such requirements include: posting an agreed number of UGCs, achieving a certain engagement rate, posting a video, etc., or combinations thereof). Subtleties of different campaign requirements can be smoothed by normalizing the outcome variable to be either a binary true/false (1/0) type or a fractional description of how successfully a User completed the requirements (i.e., 1.0 would mean all requirements completed, 0.5 half completed, and 0 none completed). The latter case presents a regression problem (instead of a classification problem), giving additional fidelity when ranking results.

1. Example Personas

For a woman's hair styling brand, platform 102 can be used to find micro-influencers based on the desired persona (i.e., criteria for a candidate):

- Are hairdressers—processing the biography
- Post selfies—analyzing the image style
- Are female—estimating the gender
- Are users of hair care products—detecting brands in images (such as Wella, etc.)

For a newly introduced plant-based skin care range a desired persona would:

- Post flat-lays—analysing the image style
- Have minimalist aesthetic—image style
- Post about flowers and floral content—object detection in images
- Write long-form captions explaining their posts
- Support vegan causes—factor in hashtags

2. Selecting Signals for an Ideal Persona

These initial signals (e.g., "is a hairdresser") can either be input manually (e.g., for a new product vertical with little prior data to base them on) or be generated automatically in situations where there is enough prior data to evaluate which signals were most effective. In this case, prior knowledge (data) around which factors led to a successful campaign in the product vertical (e.g., beauty & cosmetics) are used to find the combination of parameters that best describe effective candidates.

One way this can be achieved is by collating all features existing Users had at the beginning of their respective campaigns, determining whether they successfully completed the campaign requirements or not, and then determining which features had the most impact on outcome. One way that feature selection can be achieved is using tree-based methods which rank features based on their importance. By selecting the most important features (which can either mean the top features that describe at least a minimum fraction of the variance in the model or, e.g., the top 10 features), a catalogue of important features for product verticals can be built.

IV. Identifying Candidates

Returning to the scenario of the ACME clean water campaign, once Charlie has created a campaign in platform 102 (and once any additional prerequisites are met, such as a start date occurring), execution of the campaign can commence. A first task is for platform 102 to identify a list of candidates to potentially participate in the campaign.

A. Account/Hashtag Search

Platform 102 uses the account name(s) and hashtag(s) supplied by Charlie (or otherwise identified as being of relevance to ACME and/or clean water) as a query against platform 106. As an example, @acmesports, @acmesportsgives, # ACME4CleanWater, # SaveOurWater, etc., are submitted as a query to platform 106 (e.g., by one or more proxy servers as instructed by message system 122). As applicable, a limit on the number of results can be specified (e.g., the first 30 k results). One approach to performing such a query (if available) is to use an API provided by platform 106. Another approach to performing such a query (where an API is not available) is to use a tool that emulates a user interacting platform 106 (e.g., emulating a desktop user or a mobile user). A list of account identifiers corresponding to the users of platform 106 that follow @acmesports or @acmesportsgives, and/or that have used the hashtags # ACME4CleanWater or # SaveOurWater) is assembled from results returned by platform 106. As applicable, the list of account identifiers can be deduplicated (e.g., where a user is both as a follower of @acmesports and a user of the # SaveOurWater).

The retrieved account identifiers are inserted into relational database 126 (e.g., in a candidates_to_process table), along with an indication of why the identifiers were retrieved (e.g., user A12345 used # SaveOurWater, user A38429 follows @acmesports, etc.).

B. Data Collection and Generation

For each account identifier included in the candidates_to_process table, a data job is added to message system 122's queue. The jobs are sent, in batches, by message system 122 to an appropriate proxy server to handle. Suppose Alice's identifier on platform 106 is A424 and that Alice's identifier is included in the candidates_to_process table. When a proxy server receives the job to process identifier A424, it will fetch Alice's profile on platform 106 and see how many posts she has made. If she has made a non-zero number of posts, Alice's UGC is also fetched (either as part of the same job, or by being added to the message queue as an additional job). The fetched information (profile and UGC) is then processed (e.g., by worker system 130) in accordance with techniques described above (e.g., in conjunction with FIGS. 3A, 3B, 4A, and 4B) into a User Record and set of respective UGC Records for Alice in database 126. If this is the first time that information for a given user is being accessed/processed by platform 102, a new User Record can be created. If a User Record is already present (e.g., due to processing during a previous campaign), applicable data can be refreshed (e.g., the biographical portion of the user's account may have been changed and can be refreshed to the current version).

In some cases, a UGC and/or other information associated with a candidate may not be available. For example, if a user of platform 106 has elected to have a private account, platform 102 will be unable to access detailed information about the account. Such accounts can be removed from the list of candidates.

After information (e.g., user profile information and UGC information) is retrieved (e.g., for Alice) and stored in appropriate record(s) in database 126, additional, data enhancement jobs are commenced. Examples of data enhancement are described above, in Section III.C, and can be performed by a set of workers (e.g., python scripts) configured to populate applicable portions of the User Record and UGC Records.

C. Candidate Selection

Once a pre-filtered list of candidates has been obtained, and once records for those candidates have been processed/stored in database 126, platform 102 selects a portion of those candidates to contact for potential participation in ACME's campaign. Suppose ACME would like to engage approximately 4,000 individuals to participate in its campaign. Assuming that at least some portion of individuals contacted will choose not to participate, ACME can have platform 102 contact more than 4,000 people (e.g., 6,000) and accept the first 4,000 that accept. A variety of approaches can be used to select candidates. As a first example, platform could rank each of the candidates by their respective engagement rates and select the top 6,000 candidates to invite. (Or, in various embodiments, those Users having an engagement rate above a certain threshold amount, such as 20%, can be selected, irrespective of the total number of Users meeting that threshold, etc.) Filters can also be applied, e.g., to ensure that the candidates comply with any hard requirements ACME has specified (e.g., must be female, must have a profile that posts at least 30% landscapes, must have posted UGC that includes at least some of the following keywords: "outdoors," "adventure," "hiking," "camping"). Generally, such filters cannot be applied as pre-filters, as they require additional processing of the user's profile/UGC beyond what would be returned by platform 106 in response to a request for a profile lookup (e.g., of number of followers or number of posts).

More sophisticated approaches can also be used for selection. As one example, if ACME has provided a list of sample profiles of platform 106 users that represent the individuals it would like to target, a model can be trained using User Records and UGC Records of those sample profiles, and the candidates can be scored using the trained model. As another example, if ACME has not supplied a list of sample profiles from platform 106, one or more artificial samples can be constructed using criteria specified by ACME about the ideal candidate (e.g., with gender having no weight, but presence of park-related content (e.g., based on location, tags, image analysis, etc.) having a high weight. Further, where available, information about a given candidate's previous participation in campaigns on platform 102 can also be considered when determining whether the candidate should be selected. For example, if a User, Dave, has previously been invited to participate in two campaigns, has agreed to participate, but has unsuccessfully completed both campaigns, he can be removed from the list of candidates (or have his score reduced, as applicable).

V. Onboarding Candidates

Once the list of candidates has been finalized by platform 102, the candidates need to be invited to participate in the campaign. In some cases, a platform (e.g., platform 108) may make available contact information, such as an email address, for each candidate. In other cases, a platform (e.g., platform 106) may restrict the ability of entities to contact its users. As one example, suppose platform 106 has a "direct message" feature that allows users of platform 106 to send messages to one another. While platform 106 might permit platform 102 to send 6,000 messages to its users (inviting them to participate in ACME's campaign), more likely, platform 106 would view such activity as spam, and prevent such messages from being sent to its users.

In various embodiments, platform 102 includes a contactor module 134 configured to facilitate communications with users of platform 106. When Charlie enrolls ACME with platform 102, one piece of information that he provides is a location (or set of locations) of ACME employees managing ACME's social media. I.e., if ACME has headquarters in Boulder, Colo., and its social media team live, collectively, in Boulder and New York, "Colorado" and "New York" would be provided. Further, as discussed above, when Charlie provides information about the ACME campaign, one of the things he is asked to specify is message text to be sent to candidates. Charlie is also asked to provide platform 102 with credentials (or, as applicable, a token) that will allow platform 102 to authenticate to platform 106 as ACME.

Platform 102 will use the above information to send direct messages to each candidate on platform 106, appearing as ACME. Specifically, the list of finalized candidates is added to contactor 134's job queue. For each candidate, contactor 134 randomly selects a version of the message text provided by Charlie (or, if Charlie only provided a single version of the text, platform 102 can determine variations to make, as applicable, so that identical messages are not sent to all candidates in some embodiments). Examples of onboarding text are shown in FIGS. 10A and 10B. Specifically, example messages for a streetwear company and a cosmetics company are shown, and are examples of messages that contactor 134 could instruct sender 136 on behalf of the respective streetwear and cosmetics companies to invite users of platform 106 to their respective campaigns. In the examples shown in FIG. 10A, the messages indicate that author is working with the brand. In the examples shown in FIG. 10B, the messages indicate that they are being sent on behalf of the brand. In both cases, the messages themselves can be sent using the credentials of the account (e.g., on platform 106) of the brand, to help the recipients recognize that the message is legitimately being sent on behalf of the brand.

In various embodiments, a single node (e.g., sender 136), which is located in the same region as was provided by ACME (e.g., Boulder or New York) sends a version of the onboarding message to each of the candidates in a rate-limited manner (e.g., by sending a message to Alice, then waiting a random number of seconds between 20 and 300 before seconding one to Bob, etc.). In other embodiments (e.g., based on the size of the list of candidates), multiple senders are used. An example of a sender is an AWS EC2 t2.nano, running a set of python scripts and PHP. By taking steps such as randomizing the message sent, rate-limiting how often messages are sent, and ensuring that messages originate from IP addresses in the same general location as ACME, platform 102 will be able to send direct messages to applicable Users without ACME's account on platform 106 being blocked/flagged by platform 106 as a spammer (e.g., sending messages too frequently, too similar, and/or from a suspicious location relative to the account's typical location).

As shown in FIG. 10A, a recipient of a message sent by sender 136 can choose to participate in a campaign by taking a variety of actions. As previously mentioned, a message such as is shown in FIG. 10A is sent via platform 106 because platform 102 likely does not have information to otherwise contact the User (e.g., the User's email address). If the recipient would like to participate in the campaign, the user can respond via a direct message on platform 106 with the user's email address (1002), can send an email to an email address associated with the campaign (1004), and/or can download an app (1006) for interacting with platform 102 from an appropriate app store (e.g., app store 138). If the user opts to send an email, or replies to the direct message with the user's email, platform 102 can send the user (via email) with instructions for signing up for an account with platform 102 (and ultimately downloading the app).

Suppose Alice has been identified as a candidate for the ACME campaign, has received a message (via platform 106) and would like to participate. She downloads the app (hereinafter "Zyper app") on her phone and launches it. The Zyper app provides an interface to platform 102 (e.g., by communicating with web frontend 120) and will ask Alice to authenticate to platform 106, which will result in the Zyper app having a copy of Alice's unique identifier on platform 106 which it can match against the identifier previously stored in database 126 (i.e., Alice's User Record in database 126). Having confirmed that the installation of the Zyper app on Alice's mobile device corresponds to Alice's record on platform 102, the Zyper app will ask Alice to provide additional information about herself and accept various terms/privacy policy information/etc.

Figure 11A:
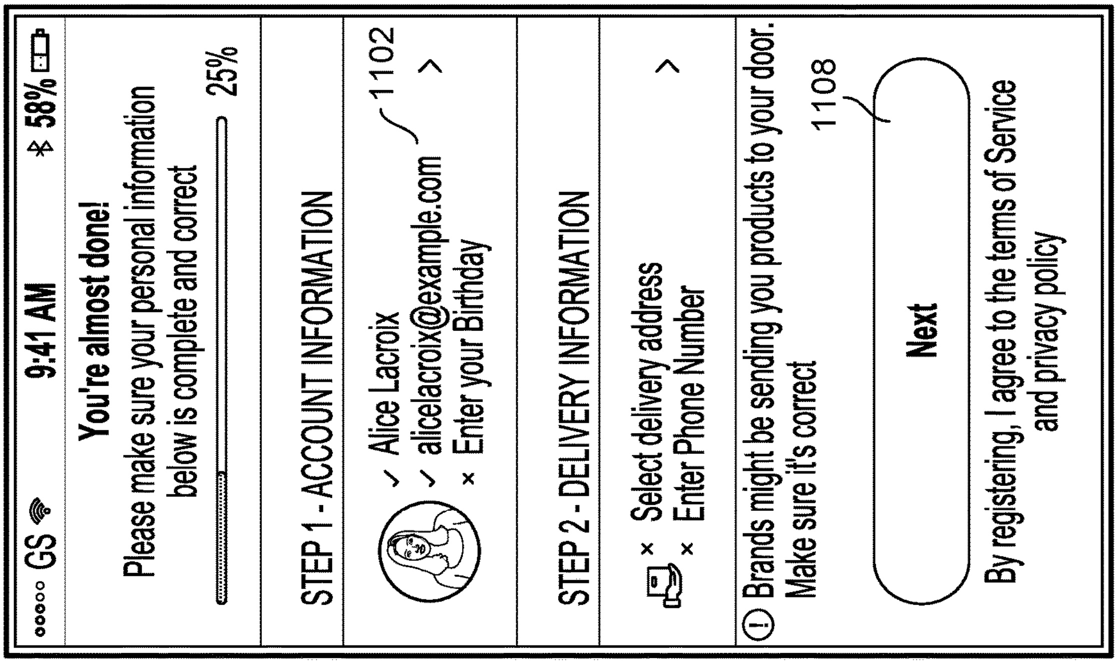
FIGS. 11A and 11B illustrate examples of a user interacting with a signup interface.
Figure 11B:
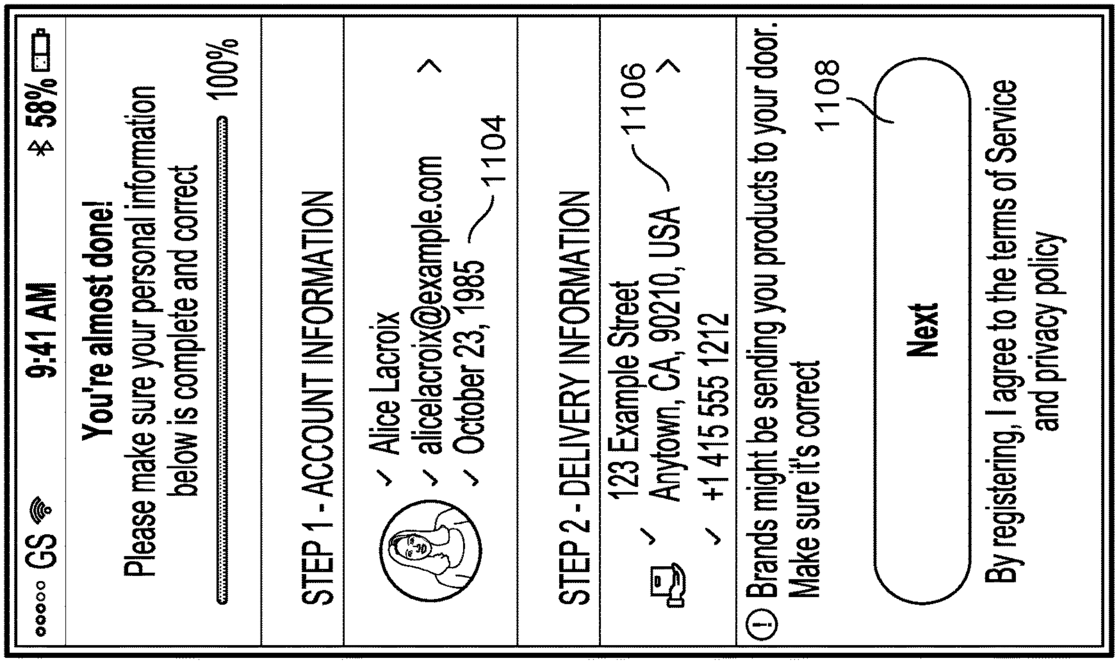

FIGS. 11A and 11B illustrate Alice interacting with her mobile phone during a signup with the Zyper app. As shown in FIG. 11A, Alice has provided her name and email address in region 1102. Similarly, she has provided her birth date (1104), mailing address and phone number (1106). The biographical information input by Alice into the Zyper app can be transmitted to platform 102 by the Zyper app and stored in her User Record (or used to update existing information included in the User Record). Other information can also be solicited, such as Alice's gender. The information can be used in future campaigns to help identify Alice as a suitable candidate where such information was previously missing for Alice (e.g., one looking for candidates born in October; one looking for candidates in a particular age range; one looking for candidates located near Anytown, Calif., etc.).

Once Alice accepts the participation terms (e.g., by clicking button 1108), her User Record will be updated to reflect that she has onboarded with platform 102. Further, by accepting the terms, in some embodiments, platform 102 will have access (via Alice's permission) to obtain additional information about Alice's account on platform 106 that would not otherwise be publicly available. The next step will be for Alice to agree to the specific terms of a specific campaign (e.g., the ACME campaign). In particular, the app will show Alice an interface similar to what is shown in FIGS. 2A-2C, where she can review the campaign instructions, and click an "I agree" button. Once Alice agrees to participate in the ACME campaign, her User Record will be tied to a record for ACME's campaign (e.g., she will be assigned a unique identifier with respect to the campaign), indicating that she is participating in the campaign (also referred to herein as being a "Fan"). In some embodiments, a separate record for Alice as a Fan (a "Fan Record") is created and tied to her User Record. In other embodiments, campaign-related information for Alice is stored in her User Record and a separate Fan Record is not created.

In various embodiments, a Fan Record (or, portion of the User Record pertinent to Fan information) has a one-to-one mapping with a user on a platform. For example, Alice's account on platform 106 would have one record on platform 102, and if she chooses to provide information about her account on platform 108 to the Zyper app (e.g., indicating she is willing to participate in campaigns on platform 108 as well), a second Fan Record can be created for Alice on platform 102 with respect to platform 108.

VI. Monitoring

A. Tracking Fan Activities

Platform 102 includes a monitoring system 138 that regularly monitors the profiles and UGC of participants in active campaigns to determine whether the participants have met various milestones/requirements of those campaigns. One way to implement monitoring system 138 is as a set of python scripts that add the identifiers of active participants to the queue of worker system 130 (e.g., once a day), which will process/refresh the User Record and UGC Records of participants. An example process that can be performed during processing of a participant's UGC during a campaign is as follows: First, hashtags and mentions are extracted from the caption. Next, extracted hashtags and mentions are compared to campaign-specific hashtag(s) required for posting for the campaign the participant is enrolled in (e.g., # ACMESports). In some cases, a User may include multiple hashtags in a single post and/or be participating in multiple campaigns at once. As one example, Alice might be participating in ACME's campaign while at the same time participating in a campaign on behalf of a sunscreen company. Each match is recorded and tallied against possible campaigns. The campaign with the most matches is selected as the correct campaign. The participant's enrollment identifier for the selected campaign is added to the UGC Record and a flag, campaign_ugc is set to true in the UGC Record. It is ensured that the associated media (images, videos) are persisted (e.g., in data lake 128 if not already present).

Monitoring System 138 includes, for each campaign, a list of fulfillment criteria (e.g., did the participant add # ACME4CleanWater to the participant's profile, did the participant generate three pieces of content that include # ACME, did the participant post an image that includes the ACME brand, etc.). Monitoring system 138 can also be configured to trigger an evaluation of a participant's profile/UGC on demand (e.g., when requested by the participant via a "check my progress" button included in the Zyper app).

Participants (e.g., Alice) can see their progress in a particular campaign in an interface provided by the Zyper app. For example, after Alice changes her profile to include "# ACME4CleanWater" in her profile, a checkmark next to that item will be shown to her in the Zyper app on her phone.

As applicable, platform 102 (e.g., via push notifications sent to a participant's Zyper app or via email) can remind participants of deadlines/requirements that they have not yet met as the campaign progresses. As one example, Alice's current progress in the campaign can be compared to target values defined by Charlie during campaign setup. If Alice has fewer than 75% (rounded down) of the expected assigned UGCs at a particular time in the campaign (e.g., by spreading the total target over the campaign time frame, excluding the first two posts to prevent unnecessary notifications) platform 102 can send an alert to Alice. As another example, if Alice is below 50% of the target at any point after the first month of the campaign, platform 102 can send Alice an alert. As another example, if a requirement states that 1 story should be posted in the first 14 days in the campaign, and this first post has not been detected after 10 days, an alert can be sent to Alice.

If the participant successfully completes all of the requirements of the campaign, appropriate rewards can be provided (e.g., by physical mailings to the participant, or redeemable digital codes being provided via the Zyper app, via email, etc.). In various embodiments, different tiers of rewards are sent to the participant based on what they accomplish during the campaign. For example, a first coupon can be automatically sent when a participant meets a particular milestone (e.g., 3 out of 10 posts), and a second coupon can be automatically sent when a participant meets a subsequent milestone (e.g., 10/10 posts, or 25% follower increase, etc.). Further, additional rewards can be sent to participants based on their performance as compared to other participants. For example, at the end of the campaign, the top three participants with the highest engagement score, highest number of posts, or some other metric or combination of metrics can be automatically selected to receive additional rewards.

B. Dashboard

Charlie can monitor the progress of the ACME campaign by interacting with web frontend 120. An example of an interface for monitoring ACME's campaign is shown in FIG. 12. Charlie can see a summary of campaign statistics in region 1202. Charlie can select a date range, in region 1204, for use when computing/displaying the statistics. Charlie can see the most recently created UGC for the campaign in region 1206. Charlie can see a summary of onboarded Fans in region 1208. As shown in region 1220, ACME had a goal of 400 participants and wound up with 411 of them. If the current participants in a campaign are underperforming, drop out, etc., Charlie can request additional candidates be considered by interacting with platform 102 (e.g., an "add more participants" dialogue). If he clicks on region 1218, he will be taken to the interface shown in FIG. 13, which provides additional detail on the campaign participants. The columns shown in FIG. 13 are configurable by Charlie.

Charlie can see how community reach has changed over time in region 1210. Charlie can see how the amount of UGC for the campaign has changed over time in region 1212. Charlie can see statistics on ACME's own account (e.g., on platform 106) in region 1214. Charlie can see hashtags that are being commonly used by Fans in region 1216.

VII. Example Process

Figure 14:
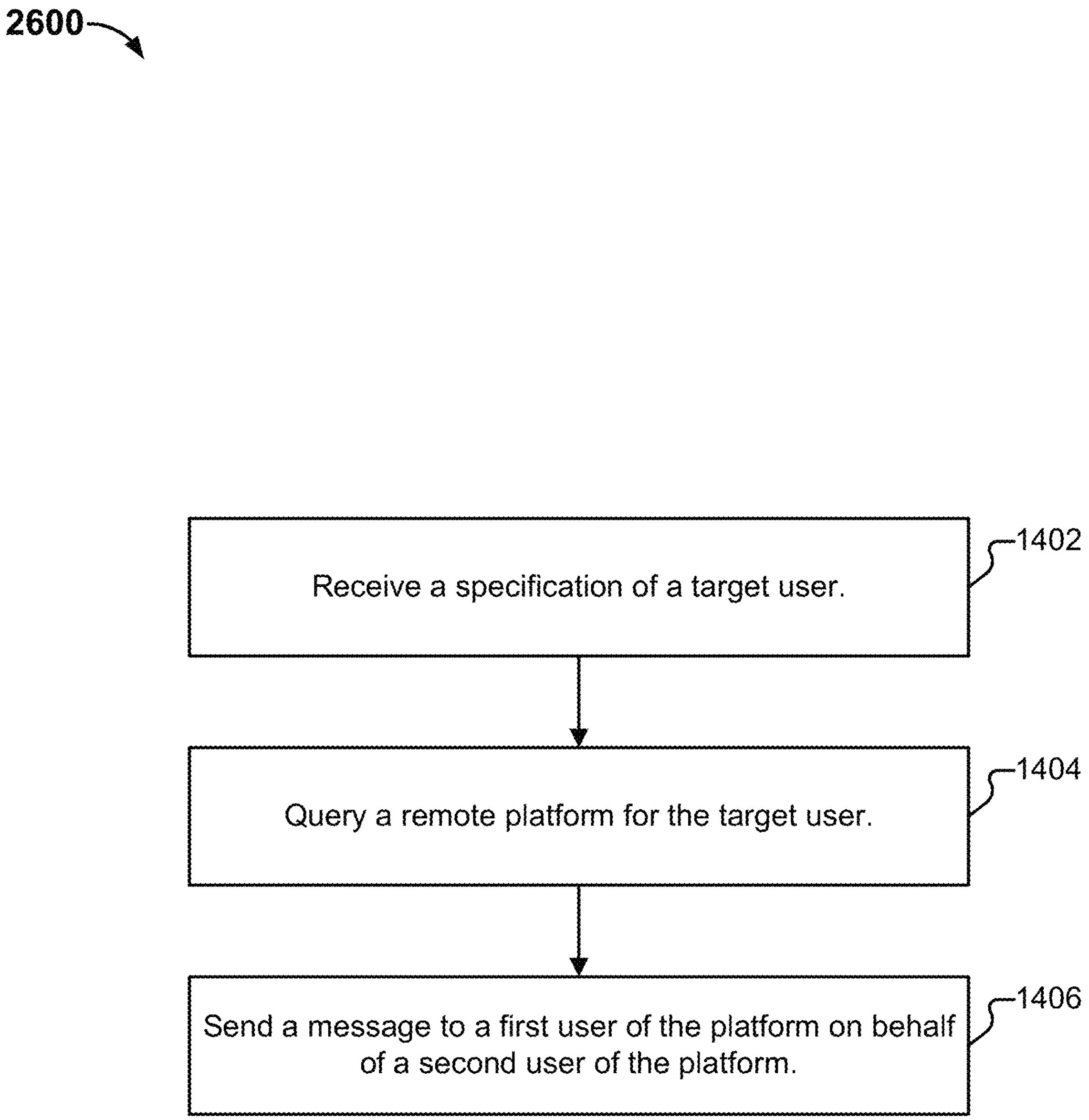
FIG. 14 illustrates an example of a process for identifying and contacting a user on a third party platform.

FIG. 14 illustrates an example of a process for identifying and contacting a user on a third party platform. In various embodiments, process 1400 is performed by platform 102. The process begins at 1402 when a specification of a target user is received. As one example, a specification of a target user can be received at 1402 when Charlie specifies characteristics of users of a social networking platform to target for a campaign. As another example, a specification can be received at 1402 when characteristics (e.g., specified by Charlie) are used to construct a query (e.g., that can be used against the third party platform). In various embodiments, a specification is received at 1402 when both of the examples occurs (e.g., in sequence).

At 1404, a remote platform is queried for the target user. As one example, the query can be performed at 1404 when platform 102 queries platform 106 for followers of a particular account (e.g., followers of @ACMESports). As another example, the query can be performed at 1406 when platform 102 queries platform 106 for users that have posted content having one or more particular characteristics (e.g., including particular hashtags, keywords, images, etc.). Results returned to the query include an identifier of at least one individual (e.g., Alice, having an identifier of A424 on platform 106).

At 1406, a message is sent to a specific user of the platform on behalf of another user of the platform. As one example of the processing performed at 1406, contactor 134 (via sender 136) sends a direct message to Alice (on platform 106) on behalf of @ACMESports.

VIII. Additional Examples of Data Structures and Information on Processing

A. Example Records

FIG. 15 illustrates an embodiment of a User Generated Content (UGC) Record.

FIG. 16 illustrates an embodiment of a UGC Processing Record (metadata).

FIG. 17 illustrates an embodiment of a Fan Record.

FIG. 18 illustrates an embodiment of a Candidate Record.

FIG. 19 illustrates an embodiment of a Campaign Record.

FIG. 20 illustrates an embodiment of an Enrollment Record. An Enrollment Record is used in various embodiments to track the status of candidates who have downloaded the Zyper app but not yet agreed to the terms of a particular campaign.

B. Tagging/Metadata for Features

As discussed above, platform 102 uses a tagging system to associate styles, objects, logos, colors, etc. to UGCs. In some embodiments, the raw output of worker system 130 when processing a UGC is stored in a meta data table called "ugc_processing_records." Within the table, each outcome (color, objects, etc.) has its own meta field (PostgreSQL JSONB) to store the raw outcomes. These have default formats that include a score and description, where the score considered by the worker's threshold. Other information is permitted. See FIG. 16 for an example.

For each type of analysis, a threshold is defined above which a tag is stored for the UGC. As applicable, the Tag (FIG. 21A) is added using a model-specific prefix (e.g. "style:" for style predictions) and associated with the UGC via the Taggings model (FIG. 21B).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

receive a specification of a target user of a remote platform, wherein the remote platform is configured to publish user generated content;

query the remote platform using at least a portion of the received specification, wherein a result of the query includes a first user of the remote platform, and wherein the first user of the remote platform is associated with at least one piece of user generated content;

select a sender node including by determining a location associated with a second user of the remote platform, wherein the second user of the remote platform is different from the first user of the remote platform;

send, by an entity that is different from the second user of the remote platform, and using the sender node, a message to the first user of the remote platform on behalf of the second user of the remote platform; and a memory coupled with the processor and configured to provide the processor with instructions.

2. The system of claim 1 wherein the message includes a link to download an application associated with the entity.

3. The system of claim 1 wherein sending the message includes using credentials of the second user provided by the second user to the entity.

4. The system of claim 1 wherein the processor is configured to send a plurality of messages to a respective plurality of individuals including the first user, and wherein sending the message to the first user includes waiting a random amount of time prior to sending the message to the first user after sending another message to another user.

5. The system of claim 1 wherein the processor is configured to select the message from a plurality of message versions, and wherein another result of the query includes another user and wherein the processor is configured to send the another user a different message version.

6. The system of claim 1 wherein the processor is further configured to analyze user generated content posted on the remote platform, and associate the first user with at least one tag based on a result of analyzing user generated content associated with the first user.

7. The system of claim 6 wherein the processor is configured to analyze the user generated content at least in part by performing image analysis on an image included in the user generated content.

8. The system of claim 6 wherein the user generated content is authored by the first user.

9. The system of claim 8 wherein the user generated content of the first user is analyzed to determine whether it fulfils a completion requirement of a campaign.

10. The system of claim 1 wherein the processor is further configured to avoid flagging an account associated with the entity, by the remote platform, by retrieving a plurality of user generated content from the remote platform using a set of proxy servers.

11. A method, comprising:

receiving a specification of a target user of a remote platform, wherein the remote platform is configured to publish user generated content;

querying the remote platform using at least a portion of the received specification wherein a result of the query includes a first user of the remote platform, and wherein the first user of the remote platform is associated with at least one piece of user generated content;

selecting a sender node including by determining a location associated with a second user of the remote platform, wherein the second user of the remote platform is different from the first user of the remote platform; and sending, by an entity that is different from the second user of the remote platform, and using the sender node, a message to the first user of the remote platform on behalf of the second user of the remote platform.

12. The method of claim 11 wherein sending the message includes using credentials of the second user provided by the second user to the entity.

13. The method of claim 11 further comprising sending a plurality of messages to a respective plurality of individuals including the first user, and wherein sending the message to the first user includes waiting a random amount of time prior to sending the message to the first user after sending another message to another user.

14. The method of claim 11 wherein the processor is configured to select the message from a plurality of message versions, and wherein another result of the query includes another user and wherein the processor is configured to send the another user a different message version.

15. The method of claim 11 further comprising analyzing user generated content posted on the remote platform, and associate the first user with at least one tag based on a result of analyzing user generated content associated with the first user.

16. The method of claim 15 further comprising analyzing the user generated content at least in part by performing image analysis on an image included in the user generated content.

17. The method of claim 15, wherein the user generated content is authored by the first user and wherein analyzing the user generated content includes determining whether the user generated content fulfils a completion requirement of a campaign.

18. The method of claim 11, wherein retrieving a plurality of user generated content from the remote platform includes using a set of proxy servers to avoid flagging an account associated with the entity, by the remote platform.

19. The system of claim 2 wherein the application is configured to communicate with the processor via an interface and wherein the processor is further configured to verify that an identity specified by a user of the application corresponds to an identity of the first user.

20. The method of claim 11 wherein the message includes a link to download an application associated with the entity.

21. The method of claim 20 further comprising verifying that an identity specified by a user of the application corresponds to an identity of the first user.

* * * * *

UNITED STATES PATENT AND TRADEMARK OFFICE

CERTIFICATE OF CORRECTION

PATENT NO. : 10,643,251 B1
APPLICATION NO. : 16/382091
DATED : May 5, 2020
INVENTOR(S) : Richard J. Hanson and Andrea Orrù

It is certified that error appears in the above-identified patent and that said Letters Patent is hereby corrected as shown below:

In the Specification

In Column 2, Line(s) 19, delete "Taggings" and insert --tagging--, therefor.

In Column 4, Line(s) 36, delete "amongs" and insert --among--, therefor.

In Column 4, Line(s) 36, delete "post-" and insert --post--, therefor.

In Column 10, Line(s) 43, delete "https://pypi.org/proj ect/gender-guesser/" and insert --https://pypi.org/project/gender-guesser/--, therefor.

In Column 16, Line(s) 24, delete "30 K" and insert --30K--, therefor.

In Column 21, Line(s) 67, delete "occurs" and insert --occur--, therefor.

In Column 22, Line(s) 52, delete "Taggings" and insert --tagging--, therefor.

Signed and Sealed this
Twenty-fourth Day of November, 2020

Andrei Iancu
*Director of the United States Patent and Trademark Office*